(12) United States Patent
Kusaka

(10) Patent No.: US 7,873,267 B2
(45) Date of Patent: Jan. 18, 2011

(54) FOCUS DETECTION DEVICE, FOCUSING STATE DETECTION METHOD AND IMAGING APPARATUS

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 338 days.

(21) Appl. No.: 12/076,921

(22) Filed: Mar. 25, 2008

(65) Prior Publication Data
US 2008/0240701 A1 Oct. 2, 2008

(30) Foreign Application Priority Data
Mar. 28, 2007 (JP) .............................. 2007-084032

(51) Int. Cl.
*G03B 13/00* (2006.01)
(52) U.S. Cl. ...................................... 396/104; 348/345
(58) Field of Classification Search ................. 396/104; 348/345
See application file for complete search history.

(56) References Cited

U.S. PATENT DOCUMENTS

| | | | | |
|---|---|---|---|---|
| 4,806,964 A | * | 2/1989 | Tamada et al. | 396/260 |
| 4,870,441 A | * | 9/1989 | Yamasaki | 396/96 |
| 5,231,442 A | * | 7/1993 | Kitazawa et al. | 396/80 |
| 5,422,701 A | | 6/1995 | Utagawa | |
| 5,532,783 A | * | 7/1996 | Kusaka | 396/116 |
| 5,999,215 A | * | 12/1999 | Tamura | 348/345 |
| 2003/0161049 A1 | * | 8/2003 | Okada et al. | 359/696 |
| 2004/0057713 A1 | | 3/2004 | Ishikawa et al. | |
| 2007/0025716 A1 | * | 2/2007 | Ichimiya | 396/147 |
| 2007/0102619 A1 | * | 5/2007 | Kusaka | 250/201.2 |
| 2007/0154200 A1 | * | 7/2007 | Utagawa et al. | 396/111 |

FOREIGN PATENT DOCUMENTS

| | | |
|---|---|---|
| JP | A-01-216306 | 8/1989 |
| JP | A-11-202193 | 7/1999 |
| JP | A-2002-250861 | 9/2002 |
| JP | A-2003-057536 | 2/2003 |
| JP | A-2006-317780 | 11/2006 |
| JP | A-2007-11314 | 1/2007 |
| JP | A-2007-33653 | 2/2007 |

OTHER PUBLICATIONS

Translation of JP Publication No. 2004-093890; Projection Image Display Device; Yamauchi, Haruhiko; Publication Date: Mar. 25, 2004.*

* cited by examiner

*Primary Examiner*—Rodney E Fuller
*Assistant Examiner*—Fang-Chi Chang
(74) *Attorney, Agent, or Firm*—Oliff & Berridge, PLC

(57) ABSTRACT

A focus detection device comprises: focus detection elements including light-receiving elements that generate a pair of signals corresponding to a pair of light fluxes each passing through an imaging optical system that includes a lens and an aperture stop; and a focus detector including a processor that determines a focus adjustment state of the imaging optical system with an f-number slower than a full-aperture of the imaging optical system when a specific condition is fulfilled.

25 Claims, 25 Drawing Sheets

FOCUS DETECTION DEVICE, FOCUSING STATE DETECTION METHOD AND IMAGING APPARATUS

INCORPORATION BY REFERENCE

The disclosure of the following priority application is herein incorporated by reference:

Japanese Patent Application No. 2007-084032 filed Mar. 28, 2007

BACKGROUND OF THE INVENTION

1. Field of the Invention

The present invention relates to a focus detection device, a focusing state detection method and an imaging apparatus.

2. Description of the Related Art

Japanese Laid Open Patent Publication No. H01-216306 discloses a focus detection device that detects the state of focus adjustment of an imaging optical system by detecting a shift manifested between a pair of images formed with a pair of focus detection light fluxes passing through the exit pupil of the imaging optical system.

SUMMARY OF THE INVENTION

There is an issue yet to be effectively addressed in the focus detection device in the related art adopting the split pupil type phase difference detection method in that if the pair of focus detection light fluxes are partially blocked at the exit pupil of the imaging optical system, the focus detection accuracy may be compromised or the focus detection may be disabled.

A focus detection device according to the present invention comprises: focus detection elements including light-receiving elements that generate a pair of signals corresponding to a pair of light fluxes each passing through an imaging optical system that includes a lens and an aperture stop; and a focus detector including a processor that determines a focus adjustment state of the imaging optical system with an f-number slower than a full-aperture of the imaging optical system when a specific condition is fulfilled.

In the focus detection device described above, it is preferable that the focus detection element includes a plurality of micro-lenses and each of the light-receiving elements is disposed in correspondence to one of the micro-lenses, which receive the light fluxes from the imaging optical system via the micro-lenses.

It is preferable that the focus detection device described above further comprises a condition judging unit that judges as to whether or not the focus adjustment state of the imaging optical system is in the specific condition. This condition judging unit can make a judgment that the focus adjustment state is in the specific condition if the focus adjustment state determined by the focus detector indicates a defocusing state. Furthermore, it is preferable that the condition judging unit makes a judgment that the focus adjustment state is not in the specific condition if the focus adjustment state indicated in a previous detection results indicates a focusing state; and the focus detector determines the focus adjustment state of the imaging optical system based upon the pair of signals generated from the light fluxes passed through the imaging optical system with the full-aperture.

It is preferable that the focus detection device described above further comprises a condition judging unit that detects whether or not the focus detection device has started up and makes a judgment that the focus adjustment state is in the specific condition if the focus detection device starts a focus detection.

It is preferable that in the focus detection device described above, the focus detector determines the f-number slower than the full-aperture based upon characteristics of the imaging optical system. It is preferable that in the focus detection device described above, the characteristics of the imaging optical system is at least one of the full-aperture in the imaging optical system, an exit pupil distance, a focal length, a position of a focusing lens and a maximum image plane defocus amount indicating a maximum defocus amount that may be measured within a focus adjustment range of the imaging optical system. It is preferable that the focus detector disallows focus detection of the imaging optical system with the f-number slower than the full-aperture if the characteristics of the imaging optical system satisfy a predetermined condition. Furthermore, it is preferable that the predetermined condition is any one of conditions that the full-aperture of the imaging optical system is slower than a predetermined aperture, a focal length of the imaging optical system is smaller than a predetermined value, an exit pupil distance indicating a distance to an exit pupil of the imaging optical system is beyond a predetermined range, and a previous defocus amount having been detected previously is equal to or greater than a maximum image plane defocus amount indicating a maximum defocus amount that may be measured within a focus adjustment range of the imaging optical system.

It is desirable that the focus detection device described above further comprises a condition judging unit that judges as to whether or not the pair of signals generated at the focus detection element are in the specific condition. It is preferable that in the focus detection device described above, the condition judging unit makes a judgment that the pair of signals are in the specific condition if the focus detector is disable to detect the focus adjustment state of the imaging optical system. It is preferable that the focus detection device described above further comprises: a contrast detection unit that detects contrast in a pair of images based upon the pair of signals generated at the focus detection element, and in this focus detection device the condition judging unit makes a judgment that the pair of signals are in the specific condition if the contrast detected by the contrast detection unit is less than a predetermined value. Furthermore, it is preferable that in the focus detection device described above, when the condition judging unit makes a judgment that the specified condition is not satisfied based upon the contrast detected by the contrast detection unit being equal to or greater than the predetermined value, the focus detector determines the focus adjustment state of the imaging optical system based upon the pair of signals generated from the light fluxes passing through the imaging optical system with the full-aperture.

It is preferable that the focus detection device described above further comprises: a condition judging unit that judges as to whether or not the focus adjustment state of the imaging optical system is in the specific condition; a brightness detection unit that detects brightness of a target object, and in this focus detection device the condition judging unit makes a judgment that the focus adjustment state of the imaging optical system is in the specific condition if the brightness detected by the brightness detection unit is equal to or greater than a predetermined value. It is preferable that in the focus detection device described above, the focus detector determines the focus adjustment state of the imaging optical system based upon the pair of signals generated from the light fluxes passing through the imaging optical system with the full-aperture if the brightness detected by the brightness detection unit is less than the predetermined value.

It is preferable that in the focus detection device described above, the focus detector determines the focus adjustment state of the imaging optical system based on the pair of signals generated from the light fluxes passing through the imaging optical system with an f-number selected under control executed during a photographing operation.

It is preferable that in the focus detection device described above, a plurality of focus detection points are set within a photographic image plane of the imaging optical system; and when calculating an extent of image shift of the imaging optical system with the f-number slower than the full-aperture of the imaging optical system, the focus detector uses the pair of signals provided from the focus detection element at a focus detection point set at the center of the photographic image plane of the imaging optical system.

An imaging apparatus according to the present invention comprises: imaging elements including light-receiving elements for imaging that receive light fluxes passing through an imaging optical system that includes a lens and an aperture stop and generate signals used to form a photographic image; focus detection elements including light-receiving elements for focus detection that generate a pair of signals corresponding to a pair of light fluxes each passing through the imaging optical system; and a focus detector including a processor that determines a focus adjustment state of the imaging optical system with an f-number slower than a full-aperture of the imaging optical system when a specific condition is fulfilled.

It is preferable that in the imaging apparatus described above, the focus detector determines the focus adjustment state of the imaging optical system based on the pair of signals generated from light fluxes passing through the imaging optical system with an f-number selected under control executed during a photographing operation.

It is preferable that the imaging apparatus described above further comprises a condition judging unit that judges as to whether or not the focus adjustment state of the imaging optical system is in the specific condition. It is preferable that the condition judging unit makes a judgment that the focus adjustment state is in the specific condition if the imaging apparatus has just started up. Furthermore, it is preferable that the imaging apparatus described above further comprises a brightness detection unit that detects brightness of a target object based upon the pair of signals generated from the focus detection element, and in this imaging apparatus the condition judging unit makes a judgment that the focus adjustment state is in the specific condition if the brightness detected by the brightness detection unit is equal to or greater than a predetermined value; and the focus detector determines the focus adjustment state of the imaging optical system based upon an image data generated from the light fluxes passing through the imaging optical system with the f-number slower than the full-aperture of the imaging optical system.

It is preferable that in the imaging apparatus described above, when one of a movie shooting mode, a continuous shooting mode and a moving subject shooting mode is selected, the focus detector determines the focus adjustment state of the imaging optical system with the f-number slower than the full-aperture of the imaging optical system.

An imaging apparatus according to another aspect of the present invention comprises: a photoelectric conversion element at which an optical image is formed with light fluxes passing through an imaging optical system that includes a lens and an aperture stop, equipped with imaging elements that generate signals used to form a photographic image and focus detection elements that generate a pair of signals corresponding to a pair of light fluxes each passing through the imaging optical system, both disposed on a single plane; and a focus detector including a processor that determines a focus adjustment state of the imaging optical system with an f-number slower than a full-aperture of the imaging optical system when a specific condition is fulfilled.

A focus detection method according to the present invention comprises: generating via focus detection elements including light-receiving elements a pair of signals corresponding to a pair of light fluxes each passing through an imaging optical system that includes a lens and an aperture stop; and detecting a focus adjustment state of the imaging optical system with an f-number slower than a full-aperture of the imaging optical system when a specific condition is fulfilled.

DESCRIPTION OF PREFERRED EMBODIMENTS

Figure 1:
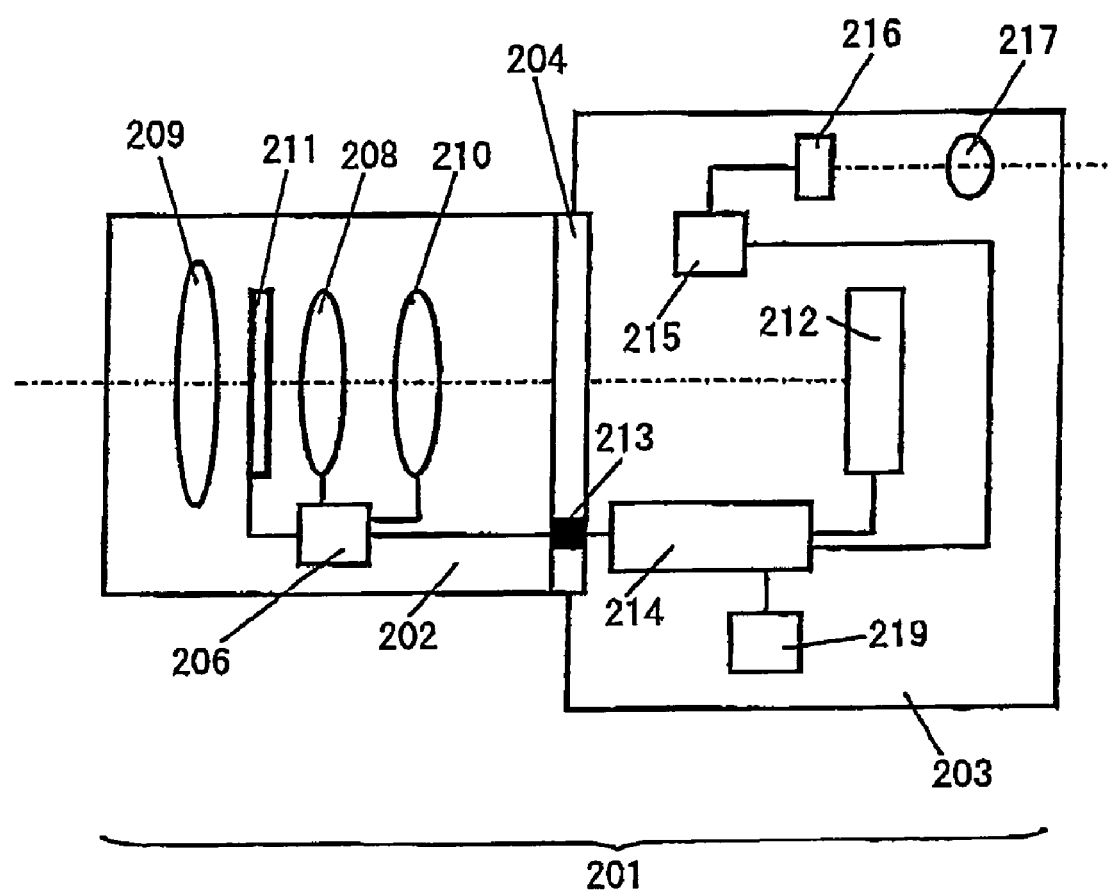
FIG. 1 is a lateral sectional view of the structure adopted in the camera achieved in an embodiment.

A digital still camera used in conjunction with interchangeable lenses, representing an example of an imaging apparatus equipped with the focus detection device achieved in an embodiment of the present invention is now explained. FIG. 1 is a lateral sectional view of the structure adopted in the camera in the embodiment. A digital still camera 201 achieved in the embodiment comprises an interchangeable lens 202 and a camera body 203. The interchangeable lens 202 is mounted at the camera body 203 via a mount unit 204.

The interchangeable lens 202 includes a zooming lens 208, a focusing lens 210, an aperture 211, a lens drive control device 206 and the like. The lens drive control device 206 is constituted with a microcomputer, a memory, a drive control circuit and the like (none shown). The lens drive control device 206 engages in communication with a body drive control device 214 to be detail later to transmit lens information to the body drive control device and receive camera information from the body drive control device, as well as executing drive control to adjust the focus of the focusing lens 210 and adjust the opening diameter at the aperture 211 and detecting the states of the zooming lens 208, the focusing lens 210 and the aperture 211. The aperture 211 forms an opening with an adjustable diameter centered on the optical axis in order to adjust the light quantity and the extent of blur. It is to be noted that while the embodiment is described in reference to an example in which the aperture 211 forms a round opening, the shape of the aperture opening is not limited to a circular shape and instead, the aperture may form a polygonal opening. In addition, the aperture 211 is used to adjust the degree of exposure and the field depth during a photographing operation and the aperture control to be detail later is executed for the aperture 211 during a focus detection operation.

An image sensor 212, the body drive control device 214, a liquid crystal display element drive circuit 215, a liquid crystal display element 216, an eyepiece lens 217, a memory card 219 and the like are disposed at the camera body 203. Imaging pixels are two-dimensionally arrayed at the image sensor 212 and focus detection pixels are also built into the image sensor over areas corresponding to focus detection positions.

The body drive control device 214 comprises a microcomputer, a memory, a drive control circuit and the like. The body drive control device 214 repeatedly executes drive control of the image sensor 212, reads out image signals and focus detection signals, executes focus detection calculation based upon the focus detection signals and adjusts the focus in the interchangeable lens 202. It also processes the image signals, records the processed image signals, controls camera operations and the like. In addition, the body drive control device 214 engages in communication with the lens drive control device 206 via an electrical contact point 213 to receive the lens information and transmit the camera information (indicating the defocus amount, the aperture value and the like).

The liquid crystal display element 216 functions as a liquid crystal viewfinder (EVF: electronic viewfinder). A through image provided by the image sensor 212, brought up on display at the liquid crystal display element 216 by the liquid crystal display element drive circuit 215, can be observed by the photographer via the eyepiece lens 217. The memory card 219 is an image storage medium in which an image captured by the image sensor 212 is stored.

A subject image is formed on the light receiving surface of the image sensor 212 with a light flux having passed through the interchangeable lens 202. The subject image undergoes photoelectric conversion at the image sensor 212 and subsequently, image signals and focus detection signals are transmitted to the body drive control device 214.

The body drive control device 214 calculates the defocus amount indicating the extent of defocusing based upon focus detection signals output from the focus detection pixels at the image sensor 212 and transmits this defocus amount to the lens drive control device 206. In addition, the body drive control device 214 processes the image signals provided from the image sensor 212 and stores the processed image signals into the memory card 219. It also provides through image signals from the image sensor 212 to the liquid crystal display element drive circuit 215 so as to bring up a through image on display at the liquid crystal display element 216. Moreover, the body drive control device 214 provides aperture control information to the lens drive control device 206 to enable control of the aperture 211.

The lens drive control device 206 adjusts the lens information in correspondence to the current focusing state, zooming state and aperture setting state, the full-aperture and the like. More specifically, the lens drive control device 206 detects the positions of the zooming lens 208 and the focusing lens 210 and the aperture value set for the aperture 211, and calculates correct lens information based upon the lens positions and the aperture value. Alternatively, it may select the lens information corresponding to the lens positions and the aperture value from a lookup table prepared in advance.

In addition, the lens drive control device 206 calculates a lens drive quantity indicating the extent to which the lens is to be driven based upon the defocus amount having been received and drives the focusing lens 210 to a focusing position based upon the lens drive quantity. In addition, the lens drive control device 206 drives the aperture 211 in correspondence to the aperture value it has received.

Interchangeable lenses 202 equipped with various imaging optical systems can be mounted at the camera body 203 via the mount unit 204 and the camera body 203 detects the state of focus adjustment of the interchangeable lens 202 currently mounted thereat based upon the output from the focus detection pixels built into the image sensor 212.

Figure 2:
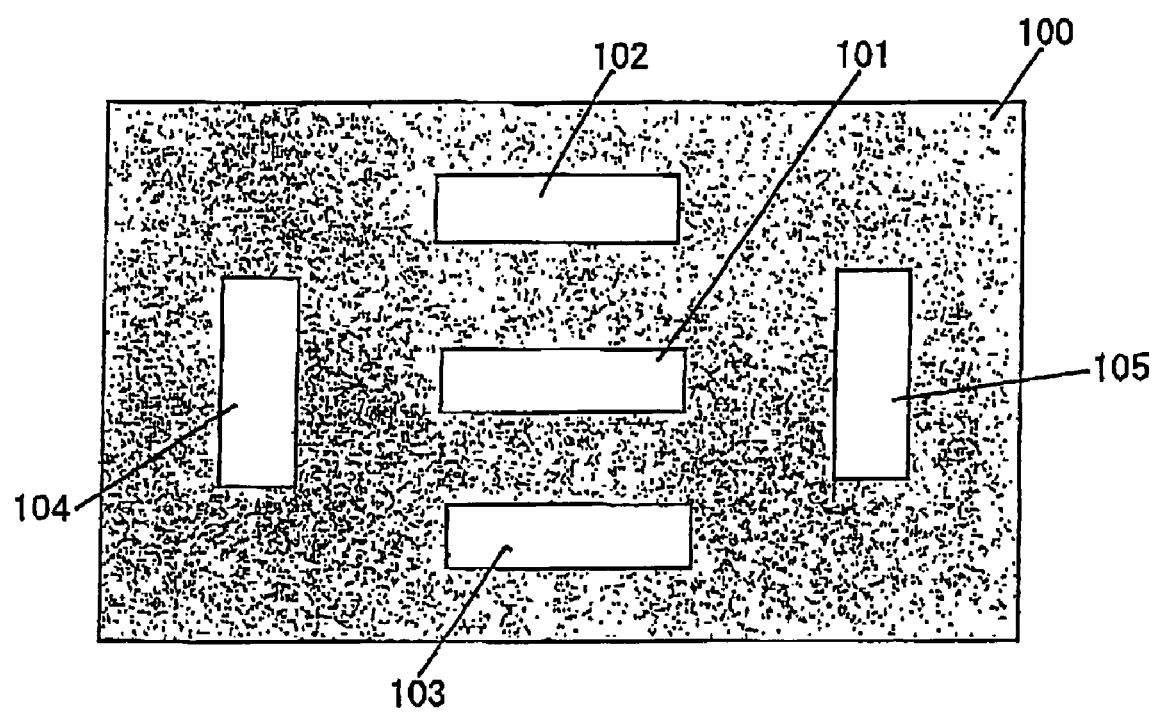
FIG. 2 shows focus detection positions assumed on the photographic image plane.

FIG. 2 shows focus detection positions of focus detection areas provided on the photographic image plane. In each of the focus detection areas, an image is sampled on the photographic image plane for focus detection via focus detection pixels rows to be detailed later. Five focus detection areas 101 through 105 are set on the photographic image plane 100. Focus detection pixels are arrayed along a straight line along the longer side of each of the focus detection areas 101 through 105 indicated as rectangular areas in the figure. The photographer manually selects a single focus detection area among the plurality of focus detection areas in correspondence to the image composition via an area selector switch (not shown).

Figure 3:
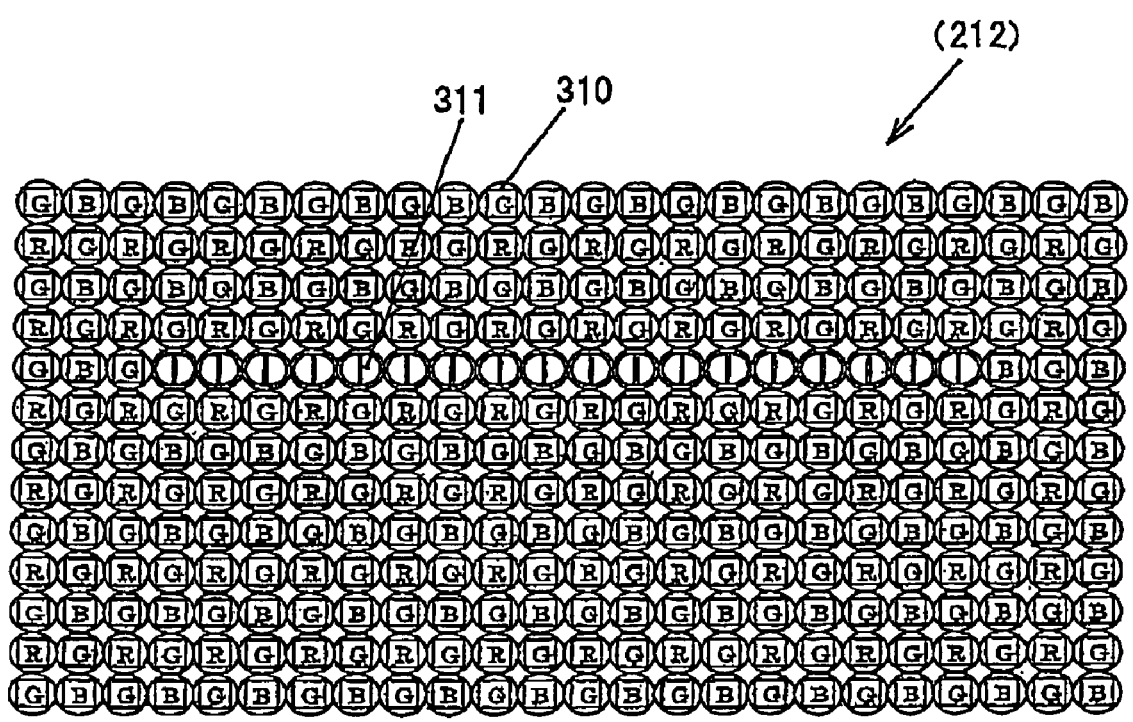
FIG. 3 is a front view showing in detail the structure adopted at the image sensor.
Figure 4:
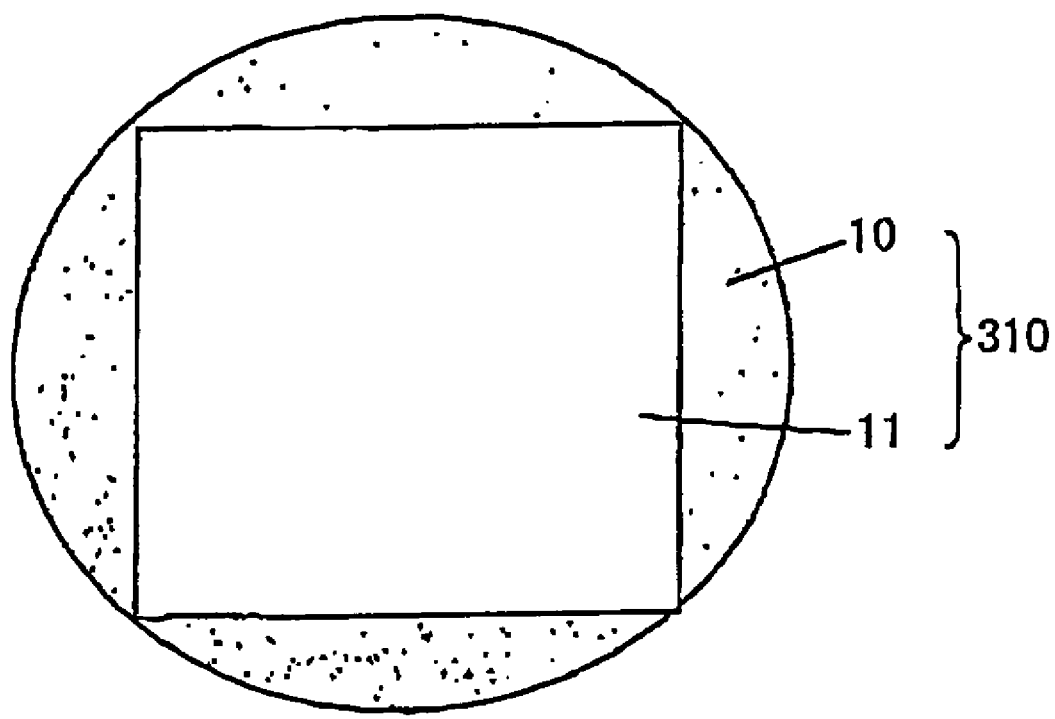
FIG. 4 shows the structure adopted at the imaging pixels.
Figure 6:
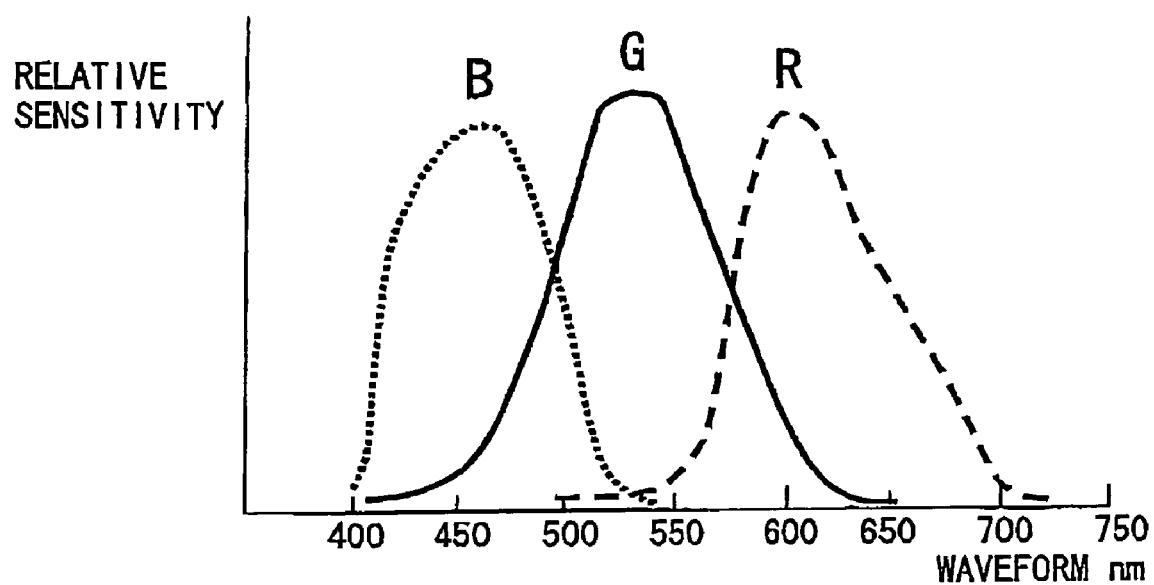
FIG. 6 shows the spectral characteristics of the green, red and blue imaging pixels.

FIG. 3 is a front view showing in detail the structure adopted in the image sensor 212, in an enlargement of the vicinity of one of the focus detection areas on the image sensor 212. The image sensor 212 is constituted with imaging pixels 310 and focus detection pixels 311. As shown in FIG. 4, the imaging pixels 310 each include a micro-lens 10, a photoelectric conversion unit 11 and a color filter (not shown). The color filters at the individual imaging pixels each assume one of the three colors, red (R), green (G) or blue (B) and the red, green and blue color filters assume spectral sensitivity characteristics shown in FIG. 6. The imaging pixels 310 equipped with such color filters are arranged in a Bayer array at the image sensor 212.

Figure 5:
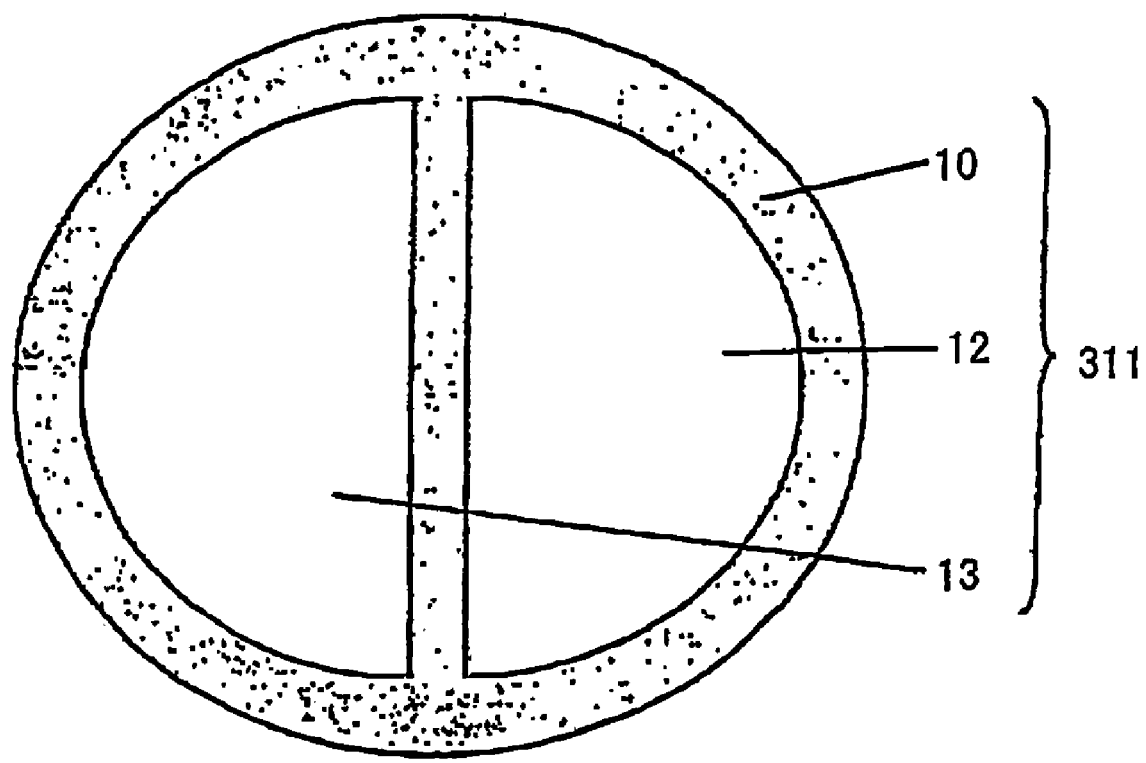
FIG. 5 shows the structure adopted at the focus detection pixels.
Figure 7:
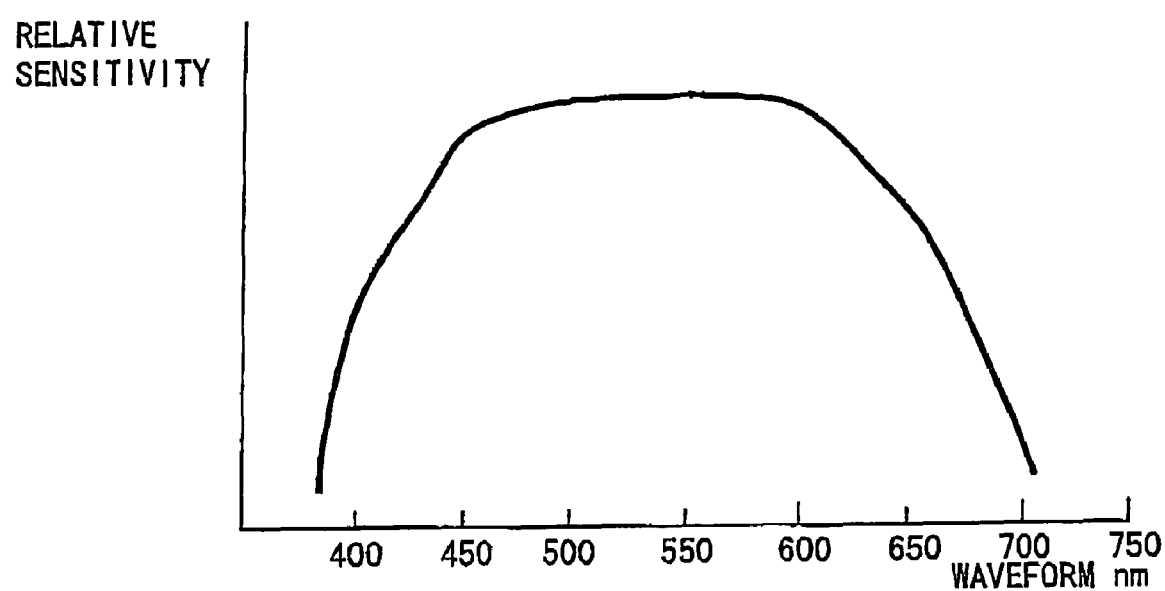
FIG. 7 shows the spectral characteristics of the focus detection pixels.

As shown in FIG. 5, the focus detection pixels 311 each include a micro-lens 10 and a pair of photoelectric conversion units 12 and 13. In order to assure a sufficient light quantity, no color filters are disposed at the focus detection pixels 311. The focus detection pixels have the spectral sensitivity characteristics (see FIG. 7), which are achieved by integrating the spectral sensitivity of the photodiodes engaged in photoelectric conversion and the spectral sensitivity characteristics of the infrared cut filters (not shown). Namely, the spectral sensitivity characteristics are similar to the sum of the spectral sensitivity characteristics of the green pixels (G), the red pixels (R) and the blue pixels (S) shown in FIG. 6, which indicate sensitivity in a light wavelength range containing the light wavelength ranges corresponding to the sensitivity characteristics of all the pixels, i.e., the green pixels, the red pixels and the blue pixels.

The photoelectric conversion unit 11 at the imaging pixel 310 is designed such that the photoelectric conversion unit allows to receive all the light flux passing through the exit pupil of a fastest interchangeable lens (e.g., equivalent to F 1.0) via the micro-lens 10. In addition, the pair of photoelectric conversion units 12 and 13 at each focus detection pixel 311 are designed so as to receive all the light fluxes passing through the exit pupil of the fastest interchangeable lens (e.g., F 1.0) via the micro-lens 10.

As shown in FIG. 3, color filters are each disposed at one of the imaging pixels 310 disposed in a two-dimensional pattern so as to achieve an RGB Bayer array. The focus detection pixels 311 are disposed along a straight line in a row that would otherwise be occupied by blue pixels B and green pixels G among the imaging pixels 310. The focus detection pixels 311 are arrayed within each focus detection area.

Figure 8:
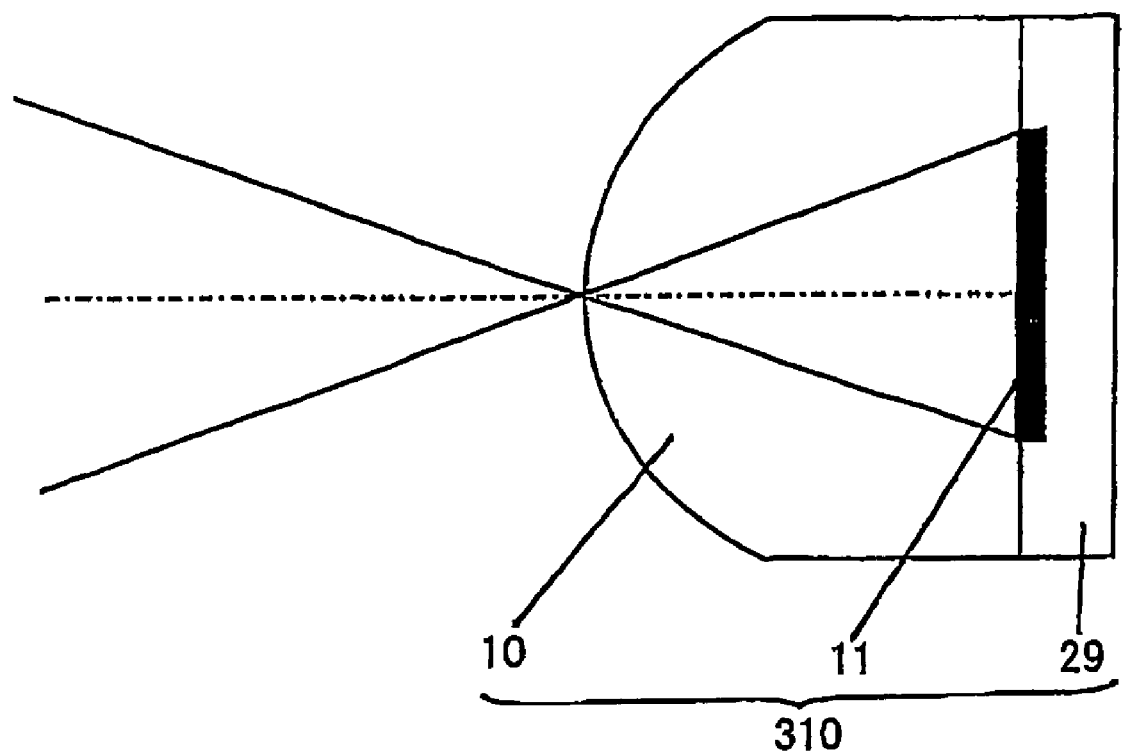
FIG. 8 is a sectional view of an imaging pixel.

FIG. 8 is a sectional view of an imaging pixel 310. The micro-lens 10 is set to the front of the imaging photoelectric conversion unit 11 at the imaging pixel 310 and, as a result, an image of the photoelectric conversion unit 11 is projected frontward via the micro-lens 10. The photoelectric conversion unit 11 is formed on a semiconductor circuit substrate 29. In addition, the color filter (not shown) is disposed between the micro-lens 10 and the photoelectric conversion unit 11.

Figure 9:
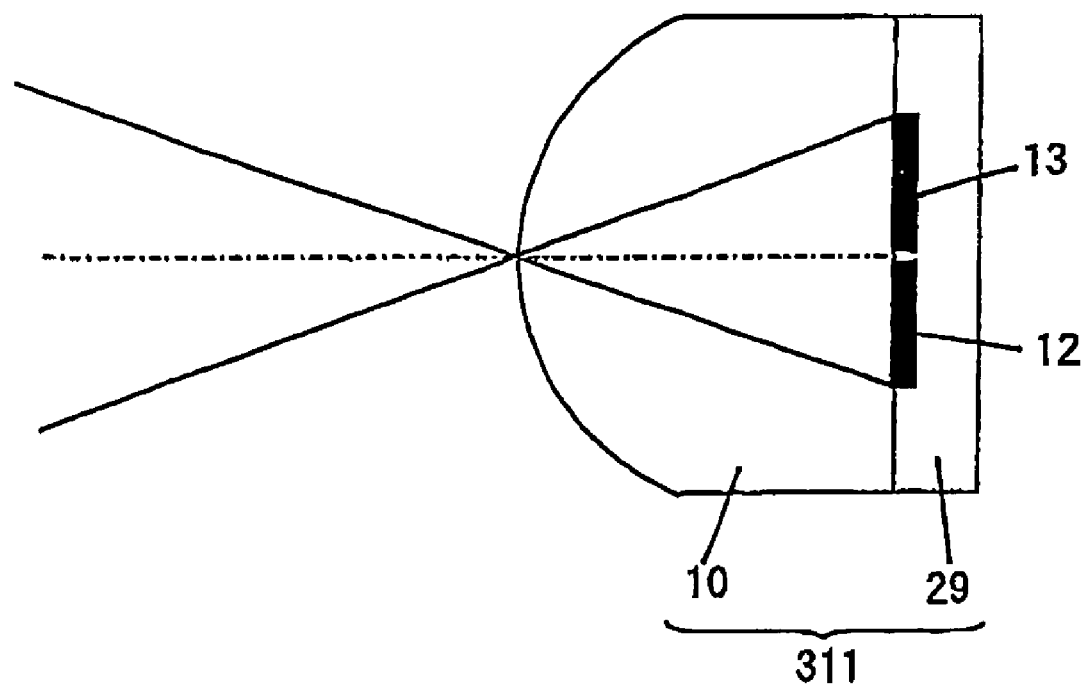
FIG. 9 is a sectional view of a focus detection pixel.

FIG. 9 presents a sectional view of a focus detection pixel 311. The micro-lens 10 is disposed to the front of the focus detection photoelectric conversion units 12 and 13 at the focus detection pixel 311 so as to project the photoelectric conversion units 12 and 13 along the frontward direction via the micro-lens 10. The photoelectric conversion units 12 and 13 are formed on the semiconductor circuit substrate 29.

Figure 10:
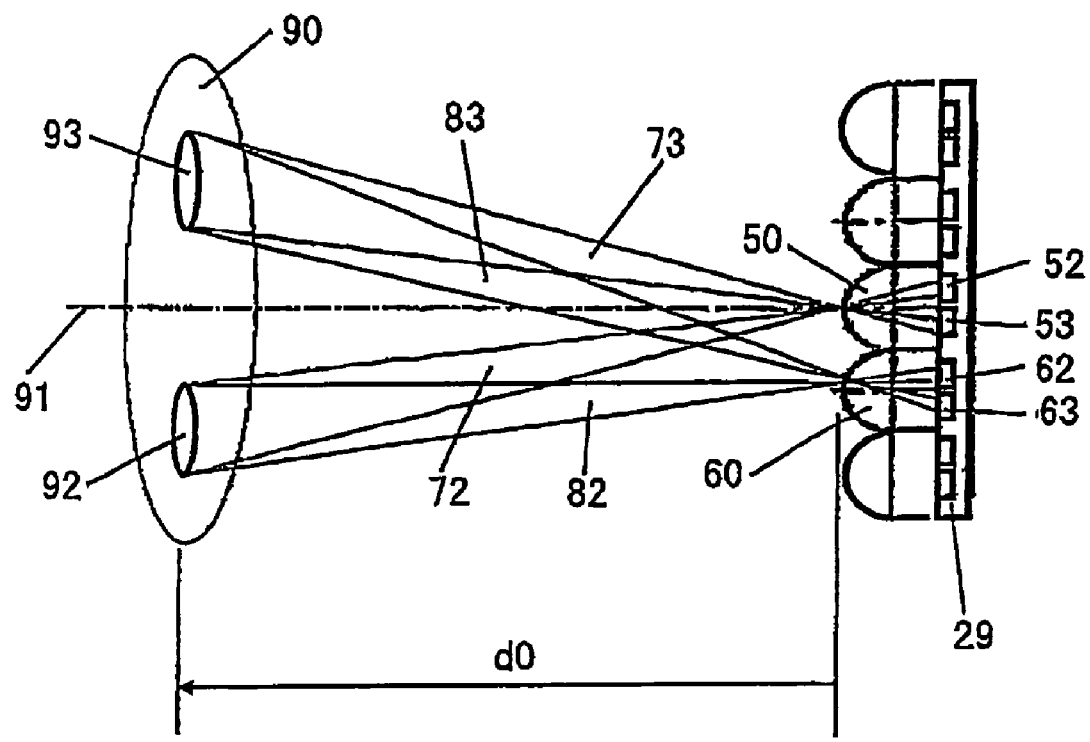
FIG. 10 illustrates focus detection executed through the split pupil method by using micro-lenses.

Focus detection adopting a split pupil method, executed by using micro-lenses, is now described in reference to FIG. 10. Reference numeral 90 in FIG. 10 indicates the exit pupil set over a distance d0 along the frontward direction from the micro-lenses disposed near the predetermined imaging plane of the interchangeable lens 202. The distance d0 is determined in correspondence to the curvature of the micro-lenses, the refractive index of the micro-lenses, the distance between the micro-lenses and the photoelectric conversion units and the like, and is referred to as a distance of pupil for focus detection in this description. Reference numeral 91 indicates the optical axis of the interchangeable lens, reference numerals 50 and 60 each indicate a micro-lens, reference numerals (52, 53) and (62, 63) indicate pairs of photoelectric conversion units at focus detection pixels and reference numerals (72, 73) and (82, 83) indicate focus detection light fluxes. Reference numeral 92 indicates an area defined by the photoelectric conversion units 52 and 62 projected via the micro-lenses 50 and 60, and this area is hereafter referred to as a pupil for focus detection in the description. Reference numeral 93 indicates an area defined by the photoelectric conversion units 53 and 63 projected via the micro-lenses 50 and 60 and this area is hereafter referred to as a pupil for focus detection.

While FIG. 10 schematically shows the focus detection pixel (constituted with the micro-lens 50 and the pair of photoelectric conversion units 52 and 53) disposed on the optical axis 91 and an adjacent focus detection pixel (constituted with the micro-lens 60 and the pair of photoelectric conversion units 62 and 63), the pairs of photoelectric conversion units of other focus detection pixels, too, receive light fluxes arriving at their micro-lenses from the pair of pupils for focus detection. It is to be noted that the focus detection pixels are arrayed in a direction matching the direction in which the pair of pupils for focus detection are set side-by-side.

The micro-lenses 50 and 60 are disposed near the predetermined imaging plane of the interchangeable lens 202. The shapes of the pair of photoelectric conversion units 52 and 53 disposed behind the micro-lens 50 set on the optical axis 91 are projected via the micro-lens 50 onto the exit pupil 90 set apart from the micro-lenses 50 and 60 by the projection distance d0, and the projected shapes define the pupils 92 and 93 for focus detection. The shapes of the pair of photoelectric conversion units 62 and 63 disposed behind the micro-lens 60 set off the optical axis 91 are projected via the micro-lens 60 onto the exit pupil 90 set apart by the micro-lenses 50 and 60 by the projection distance d0, and the projected shapes define the pupils 92 and 93 for focus detection. Namely, the directions along which individual pixels are projected via the micro-lenses are determined so that the projected shapes (pupils for focus detection 92 and 93) of the photoelectric conversion units at the various focus detection pixels are aligned on the exit pupil 90 located over the projection distance d0.

The photoelectric conversion unit 52 outputs a signal corresponding to the intensity of an image formed on the micro-lens 50 with the light flux 72 having passed through the pupil 92 for focus detection and having advanced toward the micro-lens 50. The photoelectric conversion unit 53 outputs a signal corresponding to the intensity of an image formed on the micro-lens 50 with the focus detection light flux 73 having passed through the pupil 93 for focus detection and having advanced toward the micro-lens 50. The photoelectric conversion unit 62 outputs a signal corresponding to the intensity of an image formed on the micro-lens 60 with the light flux 82 having passed through the pupil 92 for focus detection and having advanced toward the micro-lens 60. The photoelectric conversion unit 63 outputs a signal corresponding to the intensity of an image formed on the micro-lens 60 with the focus detection light flux 83 having passed through the pupil 93 for focus detection and having advanced toward the micro-lens 60.

By linearly disposing a large number of focus detection pixels each structured as described above and integrating the outputs from the photoelectric conversion units at the individual focus detection pixels into output groups each corresponding to one of the two pupils 92 and 93 for focus detection, information related to the intensity distribution of the pair of images formed on the focus detection pixel row with the individual focus detection light fluxes passing through the pupil 92 for focus detection and the pupil 93 for focus detection, is obtained. Image shift detection arithmetic processing (correlation arithmetic processing, phase difference detection processing), to be detailed later, is subsequently executed by using the information thus obtained so as to detect the extent of image shift manifested by the pair of images through the split-pupil phase difference detection method. Then, by executing a conversion operation on the image shift quantity in correspondence to the distance between the gravitational centers of the pair of pupils for focus detection, the deviation (defocus amount) of the current image forming plane (the image forming plane at the focus detection position corresponding to the position assumed by the micro-lens array on the predetermined imaging plane) relative to the predetermined imaging plane is calculated. It is to be noted that while the explanation is given above by assuming that the pupils for focus detection are not restricted at the aperture, the pupils for focus detection actually assume the shape and the size determined in correspondence to the aperture stop.

Figure 11:
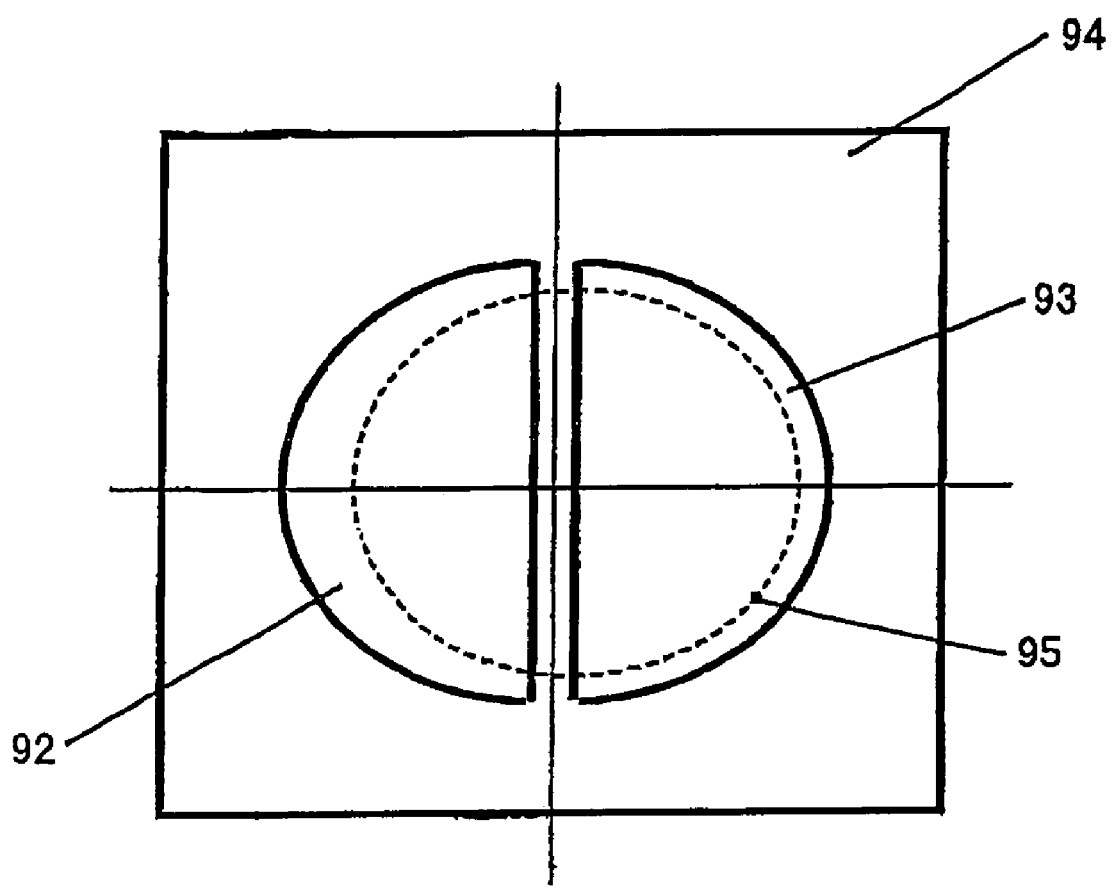
FIG. 11 is a front view of the exit pupil plane onto which the photoelectric conversion units of a focus detection pixel and an imaging pixel are projected via micro-lenses.

FIG. 11 is a front view of the exit pupil plane onto which the photoelectric conversion units of a focus detection pixel and an imaging pixel are projected via micro-lenses. A circle circumscribing the pupils 92 and 93 for focus detection defined by the pair of photoelectric conversion units of the focus detection pixel projected onto the exit pupil plane 90 via the micro-lens, viewed from the imaging plane, assumes a specific f-number (referred to as an f-number (F1) of pupil for focus detection in this description). In addition, the photoelectric conversion unit of the imaging pixel projected onto the exit pupil plane 90 via the micro-lens defines an area 94, which is a large area containing both pupils 92 and 93 for focus detection.

In FIG. 11, the positional relationship between the center of an area 95 corresponding to the aperture stop of the interchangeable lens 202, indicated by the dotted line, and the center of the circle circumscribing the pupils 92 and 93 for focus detection changes in correspondence to the position of the exit pupil, which is inherent to the particular interchangeable lens 202 and the position of the focus detection pixel assumed on the image plane (the distance from the optical axis). The positional relationship changes so that while the center of the area 95 and the center of the circle circumscribing the pupils 92 and 93 for focus detection are aligned with each other at the focus detection pixel set on the optical axis, they are not aligned with each other at a focus detection pixel set off the optical axis. If the center of the exit pupil of the interchangeable lens 202 is not aligned with the center of the circle circumscribing the pupils 92 and 93 for focus detection, the focus detection light fluxes passing through the pair of pupils 92 and 93 for focus detection become unevenly vignetted, which will result in a mismatch of the quantities of light from the pair of images formed with the focus detection light fluxes to lead to distortion.

Figure 12A:
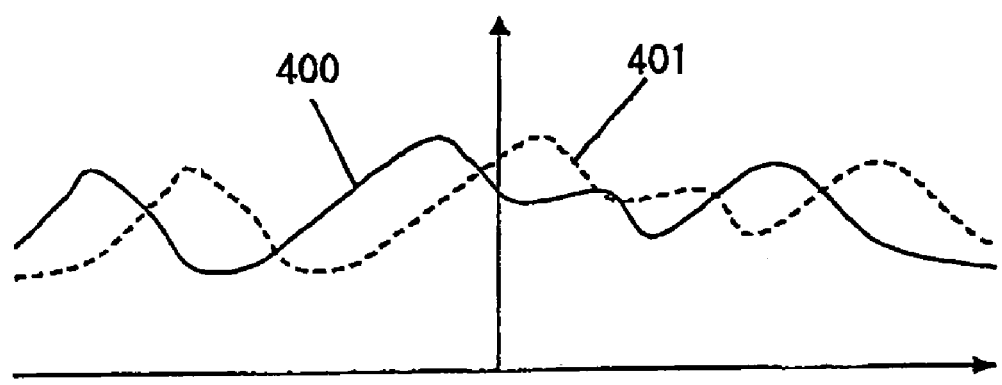
FIGS. 12A and 12B each show an intensity distribution (light quantity distribution) of image signals from focus detection pixels disposed at a focus detection position assumed in the periphery of the photographic image plane.
Figure 12B:
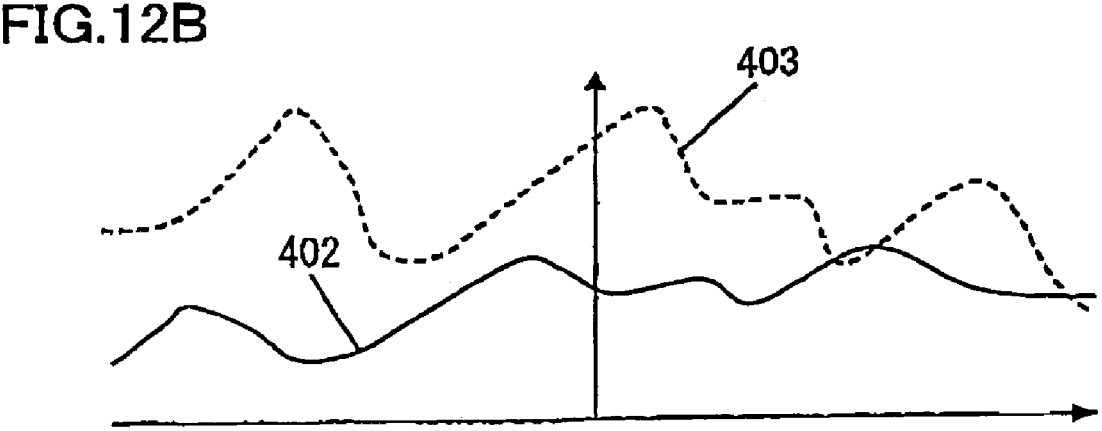

FIG. 12 shows intensity distributions (light quantity distributions) with regard to the intensity of image signals output from the focus detection pixels disposed at a focus detection position set in the periphery of the photographic image plane, with the image signal intensity indicated along the vertical axis and the focus detection pixel position indicated along the horizontal axis. As long as the focus detection light fluxes are not vignetted unevenly, a pair of sets of image data 400 and 401 achieve identical image data waveforms which are simply shifted relative to each other along the horizontal direction, as shown in FIG. 12A. However, if the focus detection light fluxes are vignetted, the quantities of light in the focus detection light fluxes passing through the pupils for focus detection change in correspondence to the focus detection position and the positional deviation manifesting within the focus detection position, and the pair of sets of image data such as image data 402 and 403 shown in FIG. 12B, do not assume identical data waveforms shifted relative to each other.

As a measure for minimizing the adverse effect of the imbalance between the pair of sets of image data attributable to such vignetting of the focus detection light fluxes, the outlines of the pair of pupils for focus detection are set in advance so that the pupils for focus detection range over an area smaller than the aperture full-open diameter of the optical system engaged in focus detection in a focus detection device adopting the split pupil phase difference detection method in the related art. However, a truly effective countermeasure against vignetting cannot be taken readily in a focus detection device that detects the state of focus adjustment through the split pupil phase difference detection method by using micro-lenses since the outlines of the pair of pupils for focus detection become blurred and spread due to the aberration and the diffraction at the micro-lenses.

Figure 13:
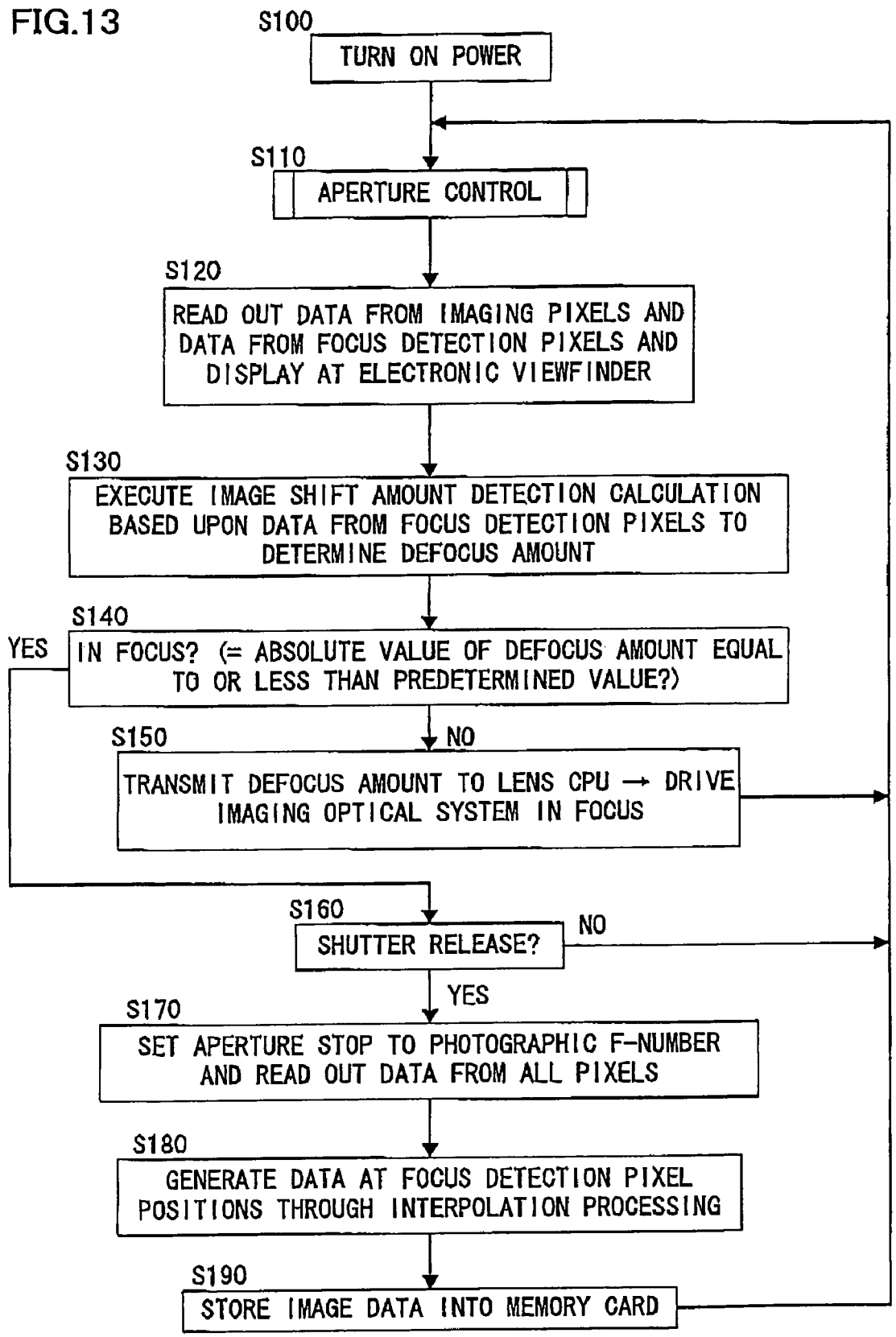
FIG. 13 presents a flowchart of the photographic operation executed in the digital still camera (imaging apparatus) in FIG. 1.
Figure 14:
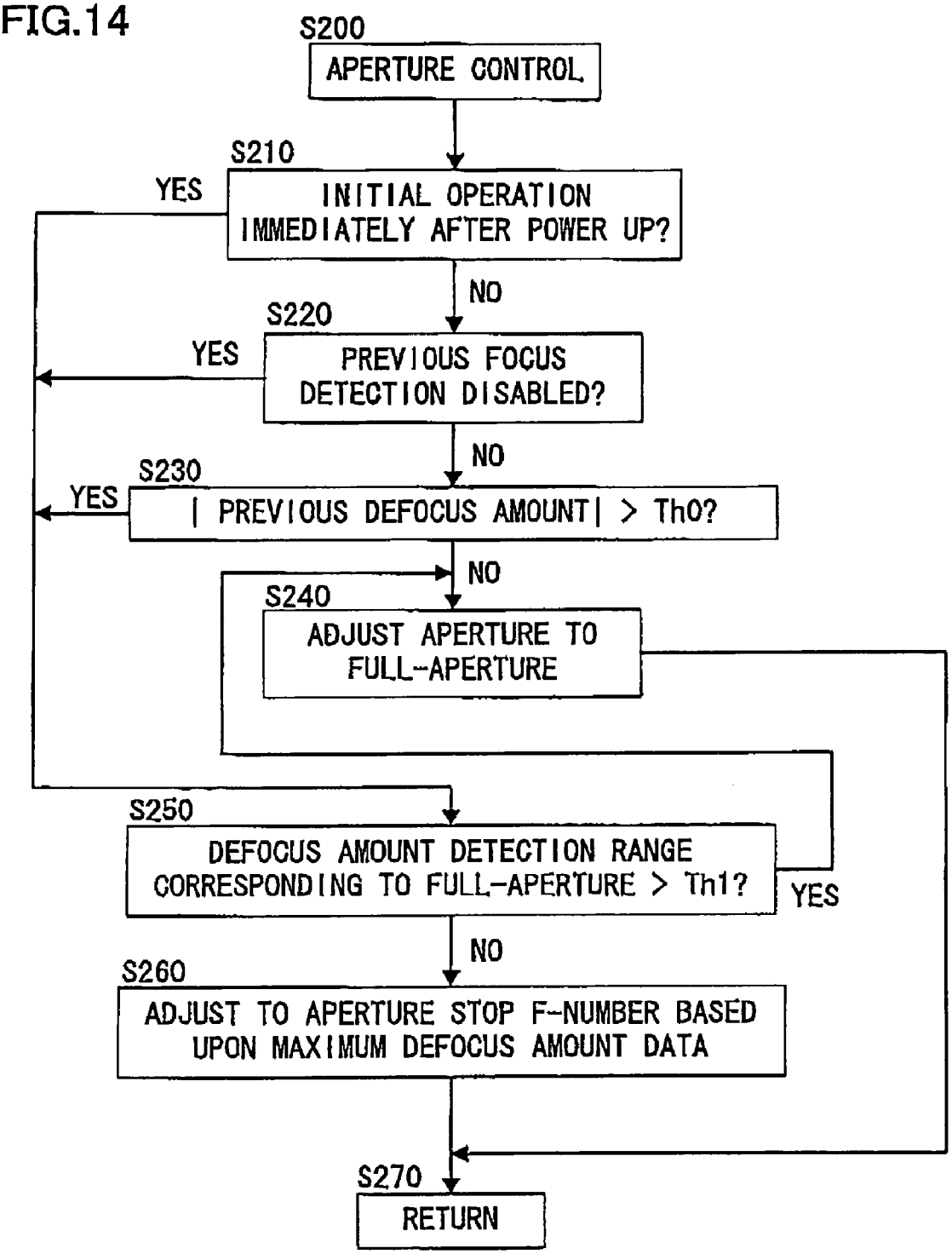
FIG. 14 presents a flowchart of the aperture control subroutine.

FIG. 13 presents a flowchart of the photographing operation executed in the digital still camera (imaging apparatus) shown in FIG. 1. The body drive control device 214 starts the photographing operation as the power to the camera is turned on in step 100. In step 110, the subroutine shown in FIG. 14 is executed so as to control the aperture. This aperture control is to be described in detail later. In step 120, exposure control of the image sensor 212 is executed, data from the imaging pixels and the focus detection pixels are read out and the data from the imaging pixels are displayed at the electronic viewfinder. It is to be noted that a specific focus detection area has been selected by the photographer via the area selector switch.

In step 130, the image shift detection arithmetic processing (correlation arithmetic processing) to be detailed later is executed based upon the pair of sets of image data corresponding to the particular focus detection pixel row to calculate an image shift quantity and ultimately calculate the defocus amount. In step 140, a decision is made as to whether or not the current condition is close in focus, i.e. whether or not the absolute value of the defocus amount having been calculated is equal to or less than a predetermined value. If it is decided that the current condition is not close in focus, the operation proceeds to step 150 to transmit the calculated defocus amount to the lens drive control device 206 which then drives the focusing lens 210 of the interchangeable lens 202 to the focus position. Then, the operation returns to step 110 to repeatedly execute the operation described above. It is to be noted that the operation also branches to this step if focus detection is not possible to transmit a scan drive instruction to the lens drive control device 206. In response, the lens drive control device drives the focusing lens 210 of the interchangeable lens 202 to scan between the infinity position and the close-up position. Subsequently, the operation returns to step 110 to repeatedly execute the operation described above.

If, on the other hand, it is decided that the current condition is close in focus, the operation proceeds to step 160 to make a decision as to whether or not a shutter release has occurred in response to an operation of the shutter release button (not shown). If it is decided that a shutter release has not yet occurred, the operation returns to step 110 to repeatedly execute the operation described above. If it is decided that a shutter release has occurred, the operation proceeds to step 170 to transmit the aperture control information to the lens drive control device 206 and thus set the aperture at the interchangeable lens 202 to the photographic aperture value. As the aperture control ends, the image sensor 212 is engaged in an imaging operation and image data originating from the imaging pixels and all the focus detection pixels at the image sensor 212 are read out.

In step 180, image data at positions assumed by the individual pixels in the focus detection pixel rows are interpolated based upon the data at the focus detection pixels and surrounding imaging pixels. In the following step 190, image data constituted with the data at the imaging pixels and the interpolated data are recorded into the memory card 219, and then the operation returns to step 110 to repeatedly execute the operation described above.

FIG. 14 presents a flowchart of the aperture control subroutine. In step 210, a decision is made as to whether or not the current photographing operation is the initial photographing operation executed immediately after a power-up and if it is decided that the current operation is the initial operation executed immediately after a power-up, the operation proceeds to step 250. If, on the other hand, the current session is not the initial operation executed immediately after a power-up, the operation proceeds to step 220 to make a decision as to whether or not focus detection was disabled in the previous cycle. If it is decided that the focus detection was disabled, the operation proceeds to step 250. If it is decided that the focus detection was not disabled in the previous cycle, the operation proceeds to step 230 to make a decision as to whether or not the absolute value of the defocus amount indicated in the results of the focus detection executed in the previous cycle is equal to or greater than a predetermined value Th0. If it is decided that the defocus amount absolute value is equal to or greater than the predetermined value Th0, the operation proceeds to step 250. If, on the other hand, the defocus amount absolute value is judged to be less than the predetermined value Th0, the operation proceeds to step 240. In step 240, a command is issued to the lens drive control device 206 to control the aperture 211 at the interchangeable lens 202, so as to adjust it to the full-aperture and in the following step 270, the operation makes a return.

In step 250, a decision is made as to whether or not the defocus amount detection range corresponding to the full-aperture (lens information) at the interchangeable lens 202 is equal to or greater than a predetermined value Th1, and if the defocus amount detection range is judged to be equal to or greater than the predetermined value Th1, the operation proceeds to step 240. In step 240, a command is issued to the lens drive control device 206 to control the aperture 211 at the interchangeable lens 202 so as to adjust it to the full-aperture as described earlier and then, in the following step 270, the operation makes a return. If, on the other hand, the defocus amount detection range corresponding to the full-aperture (lens information) at the interchangeable lens 202 is judged to be less than the predetermined value Th1, the operation proceeds to step 260. In step 260, a command is issued to the lens drive control device 206 so as to adjust the aperture to an aperture opening f-number corresponding to the maximum image plane defocus amount data (lens information), before the operation makes a return in step 270.

The term "maximum image plane defocus amount data" in this context refers to data indicating either a defocus amount (1) or a defocus amount (2) below, whichever assumes a greater value.
(1) The defocus amount at an image plane detected by viewing a subject at infinity, with the focusing lens 210 at the interchangeable lens 202 set at the shortest photographing distance.
(2) The defocus amount at an image plane detected by viewing a subject at the shortest photographing distance with the focusing lens 210 set at infinity.

Namely, the maximum image plane defocus amount data indicate the maximum extent of defocusing that can occur under regular operating conditions in which the interchangeable lens 202 may be used.

Figure 15:
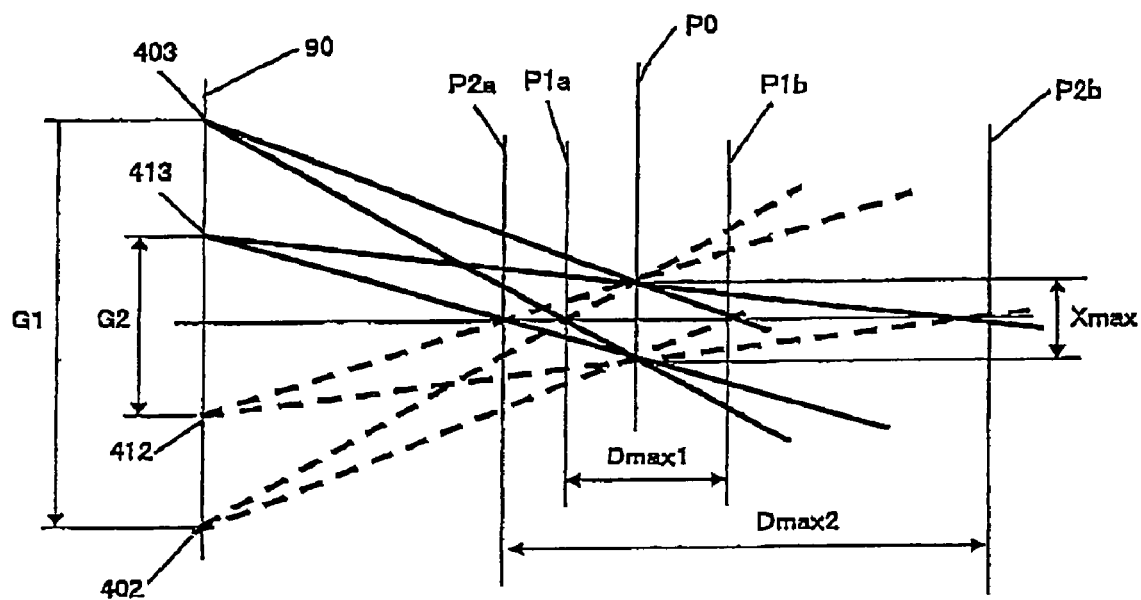
FIG. 15 illustrates the relationship between the aperture diameter and the defocus detection range.
Figure 16:
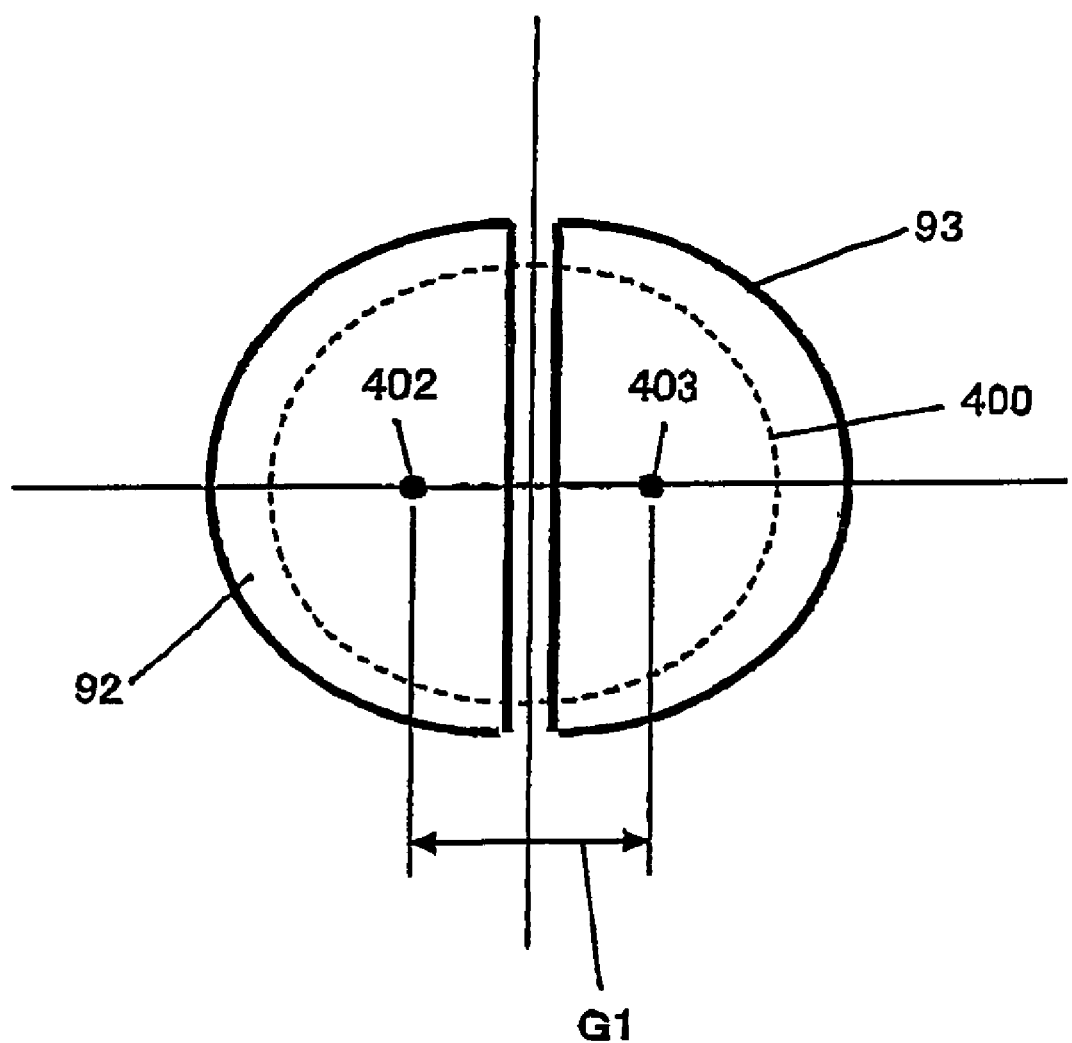
FIG. 16 is a front view of the exit pupil plane, provided to facilitate an explanation of restriction on the pupil for focus detection effected via the aperture diameter representing the full-aperture.
Figure 17:
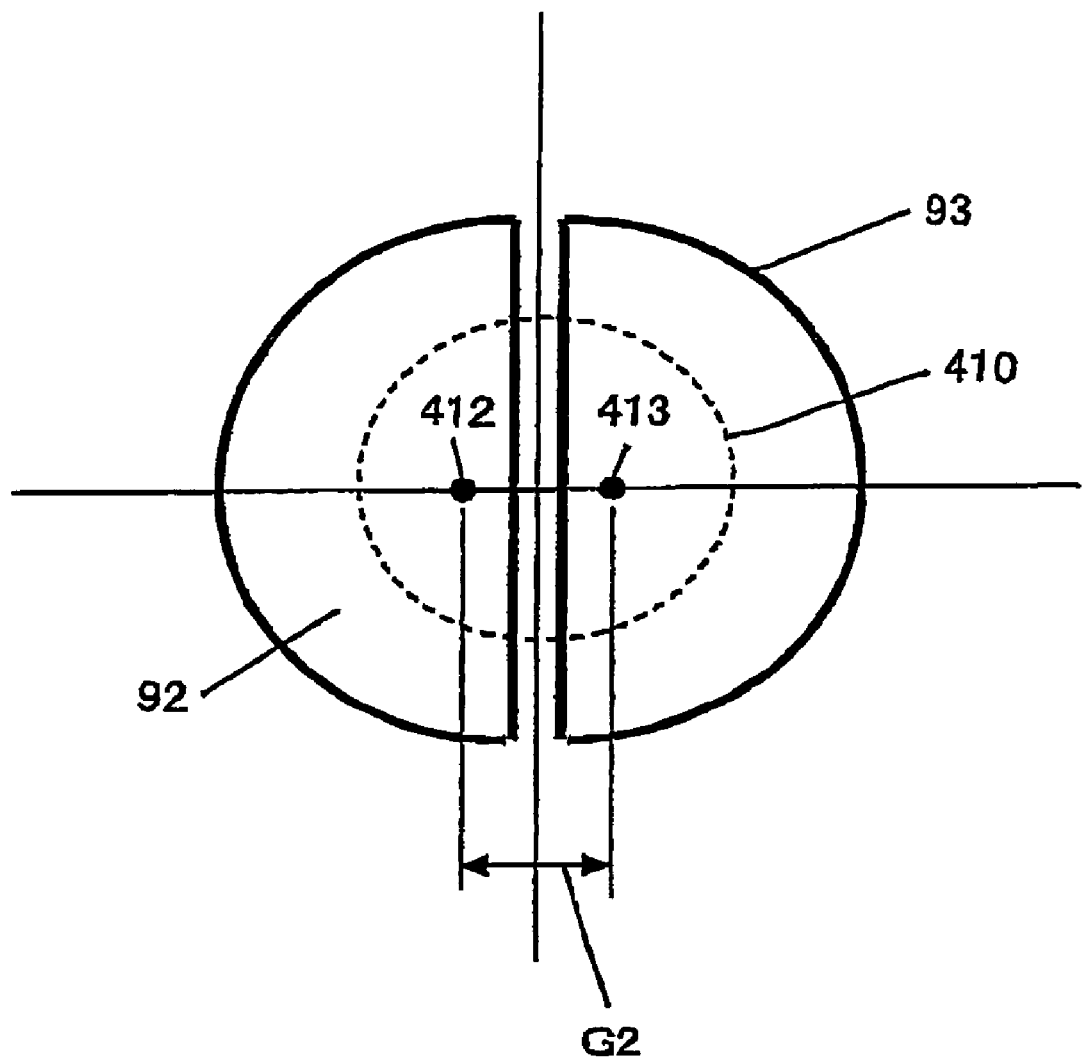
FIG. 17 is a front view of the exit pupil plane, provided to facilitate an explanation of restriction on the pupil for focus detection effected at the aperture diameter slower than the full-aperture.

FIG. 15 illustrates the relationship between the aperture diameter and the defocus detection range. FIGS. 16 and 17 each presents a front view of the exit pupil plane provided to facilitate an explanation of restriction on a pupil for focus detection effected with a specific aperture diameter. In these figures reference numerals 402 and 403 respectively indicate the gravitational centers of the pupils for focus detection 92 and 93 restricted by an opening diameter 400 corresponding to the full-aperture, with G1 representing the distance between the gravitational centers 402 and 403 of the pupils for focus detection. In addition, reference numerals 412 and 413 respectively indicate the gravitational centers of the pupils for focus detection 92 and 90 restricted by an opening diameter 410 corresponding to an f-number slower than the full-aperture, with G2 representing the distance between the gravitational centers 412 and 413 of the pupils for focus detection. P0 represents the predetermined imaging plane.

Xmax in FIG. 15 indicates the maximum image shift quantity that can be detected at the predetermined imaging plane P0. This quantity is affected by the length over which the focus detection pixel row ranges. A plane P1a is a plane at which the image shift quantity manifesting at the predetermined imaging plane P0 assumes the maximum image shift value Xmax when light beams passing through the gravitational centers 402 and 403 of the pupils for focus detection achieve focus further frontward (further toward the imaging optical system) relative to the predetermined imaging plane P0 at the full-aperture. A plane P1b is a plane at which the image shift quantity manifesting at the predetermined imaging plane P0 assumes the maximum image shift value Xmax when light beams passing through the gravitational centers 402 and 403 of the pupils for focus detection achieve focus further rearward (further away from the imaging optical system) relative to the predetermined imaging plane P0 at the full-aperture. A plane P2a is a plane at which the image shift quantity manifesting at the predetermined imaging plane P0 assumes the maximum image shift value Xmax when light beams passing through the gravitational centers 412 and 413 of the pupils for focus detection achieve focus further frontward relative to the predetermined imaging plane P0 at an f-number slower than the full-aperture. A plane P2b is a plane at which the image shift quantity manifesting at the predetermined imaging plane P0 assumes the maximum image shift value Xmax when light beams passing through the gravitational centers 412 and 413 of the pupils for focus detection achieve focus further rearward relative to the predetermined imaging plane P0 at an f-number slower than the full-aperture.

In focus detection executed at the full-aperture, the difference between the plane P1a and the plane P1b is the defocus amount detection range Dmax1, whereas in focus detection executed at an f-number slower than the full-aperture, the difference between the plane P2a and the plane P2b is the defocus amount detection range Dmax2. As FIG. 15 clearly indicates, the defocus amount detection range Dmax2 corresponding to an f-number slower than the full-aperture is greater than the defocusing amount detection range Dmax1 at the full-aperture. Namely, a greater extent of defocusing can be detected by selecting the f-number slower than the full-aperture in correspondence to a given maximum image shift quantity Xmax.

In step 250 in FIG. 14, the defocus amount detection range (equivalent to Dmax1 in FIG. 15) corresponding to the full-aperture of the interchangeable lens 202 is determined based upon the full-aperture of the interchangeable lens 202 (imaging optical system) and data indicating the maximum image shift quantity Xmax, and then the defocus amount detection range thus determined is compared with the predetermined specific value Th1. If the defocus amount detection range (Dmax1) is equal to or greater than the predetermined value Th1, a large defocus amount indicating a significant extent of defocusing can be detected at the full-aperture of the interchangeable lens 202. Accordingly, it is judged that the aperture does not need to be adjusted to an f-number slower than the full-aperture in order to increase the defocus amount detection range. If, on the other hand, the defocus amount detection range (Dmax1) is less than the predetermined value Th1, the setting at the interchangeable lens 202 is too bright (fast), and any significant extent of defocusing cannot be detected at the full-aperture. Accordingly, it is judged that the aperture must be adjusted to an f-number slower than the full-aperture in order to increase the defocus amount detection range. It is to be noted that a value determined through testing should be set as the predetermined value Th1.

In addition, in step 260 in FIG. 14, the gravitational center distance G of the pupil for focus detection is determined based upon the maximum image plane defocus amount data and the maximum image shift quantity Xmax and the aperture is controlled so as to adjust it to an f-number at which the gravitational center G of pupil for focus detection having been determined is achieved, i.e., the f-number corresponding to the maximum image plane defocus amount data. In other words, the aperture is adjusted to the opening f-number at which the maximum image plane defocus amount indicating the largest possible extent of image plane defocusing that may occur at the interchangeable lens 202 can be detected. The maximum image plane defocus amount Dmax, the maximum image shift quantity Xmax and the gravitational center distance G of the pupil for focus detection have a relationship that may be expressed in the following simplified expression with d0 representing the distance between the predetermined imaging plane P0 and a plane of the pupil for focus detection.

$$G \times D\text{max} = X\text{max} \times d0 \quad (1)$$

The conditions under which the aperture is adjusted to the full-aperture (step 240) and the conditions under which the aperture is adjusted to an f-number less than full-aperture (step 260) in the flowchart presented in FIG. 14 are summarized in Table 1.

TABLE 1

| 1 | aperture full-open |
| | not immediately after power-up, and |
| | previous focus detection was not disabled, and |
| | previous defocus amount was small, |
| | or |
| | immediately after power-up, or |
| | previous focus detection was disabled, or |
| | previous defocus amount was large, |
| | and |
| | defocus amount corresponding to full-aperture is |
| | equal to or greater than predetermined value |
| 2 | f-number slower than the full-aperture |
| | immediately after power-up, or |
| | previous focus detection was disabled, or |
| | previous defocus amount was large, |
| | and |
| | defocus amount corresponding to full-aperture is |
| | equal to or less than predetermined value |

Immediately after a power-up, the photographing distance set for the previous photographing operation is sustained for the focusing lens 210 and if this photographing distance setting is retained for the current photographing operation, a great extent of defocusing is likely to occur. Accordingly, an f-number slower than the full-aperture is selected to ensure that focus detection is not disabled.

Figure 18A:
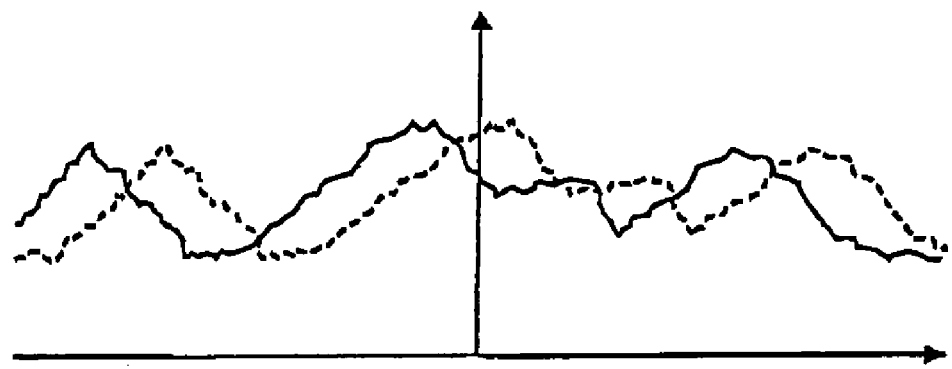
FIGS. 18A through 18C show image intensity distributions detected by varying the width of the pupils for focus detection along the direction in which the pupils for focus detection are set side-by-side.
Figure 18B:
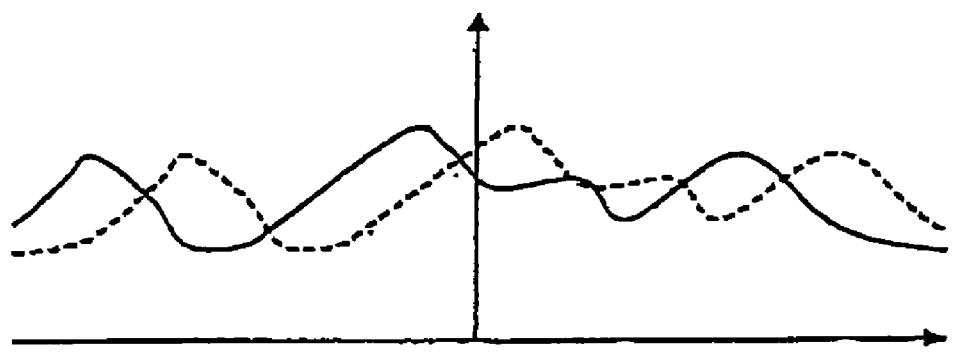
Figure 18C:
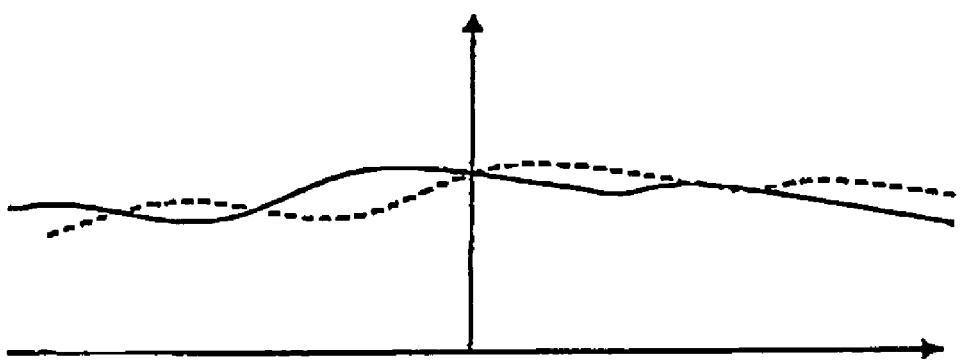

The previous focus detection may have been disabled if a significant extent of defocusing resulted in an image shift quantity exceeding the detectable maximum image shift quantity Xmax or if a significant extent of defocusing resulted in lowered image contrast, which ultimately results in disabled image shift quantity detection. The latter case is first explained. FIGS. 18A, 18B and 18C respectively show the distributions of image intensity detected by adjusting the width of one of the pupils for focus detection along the direction in which the pupils for focus detection are set side-by-side to a small setting, an intermediate setting and a large setting relative to a given large extent of defocusing (relative to a single image shift quantity). As shown in FIG. 18C, if the width of the pupil for focus detection measured along the direction in which the pupils are set side-by-side is large, the fine image structure becomes blurred and the resulting data contain a low-frequency component alone, making it difficult to accurately detect the image shift or even disabling image shift detection. In contrast, if the width of the pupil for focus detection measured along the direction in which the pupils are set side-by-side is small, the fine image structure is preserved and accurate image shift detection is thus enabled even in the event of defocusing, as shown in FIG. 18A. Thus, it can be ensured that the focus detection is not disabled either when a significant extent of defocusing results in an image shift quantity exceeding the maximum image shift quantity Xmax or when a significant extent of defocusing lowers the image contrast that would otherwise disable the image shift quantity detection, by adjusting the aperture to an f-number slower than the full-aperture.

If it is decided in step 230 in FIG. 14 that the absolute value of the previous defocus amount is greater than the predetermined value Th0, the aperture is adjusted to the aperture opening f-number corresponding to the maximum defocus amount data. If the defocus amount ascertained through the previous focus detection is large, the current focus detection is executed at an f-number slower than the full-aperture so as to enable detection of a large defocus amount in the current focus detection as well. It is to be noted that a value ascertained through testing should be set as the predetermined value Th0.

If the defocus amount corresponding to the full-aperture is equal to or less than the predetermined value, the current focus detection is executed at an f-number slower than the full-aperture so as to enable detection of a large defocus amount through the current focus detection as well.

It is to be noted that the conditions listed in Table 1 simply represent an example and that the aperture may be controlled so as to adjust it to a specific setting under a specific single condition or under conditions in another combination. For instance, focus detection is executed with the aperture adjusted to an f-number slower than the full-aperture when the defocus amount corresponding to the full-aperture is equal to or less than the predetermined value in Table 1. As an alternative, defocus deviation corresponding to the shortest photographing distance and the infinite distance relative to the current position may be calculated based upon the position information (indicating the photographing distance), with regard to the current position of the focusing lens 210 and focus detection may be executed with the aperture adjusted to an f-number slower than the full-aperture only if the defocus deviation thus determined is significant. Namely, if the focusing lens position indicates a photographing distance substantially halfway between the shortest distance and the infinite distance, the shortest distance and the infinite distance are both within the range of the defocus amount Dmax1 at the full-aperture shown in FIG. 15 and accordingly, focus detection may be executed without adjusting the aperture, which currently assumes the full-aperture. In addition, if the focusing lens position indicates a photographing distance closer to either the shortest distance or the infinite distance, the shortest distance or the infinite distance is beyond the range of the defocus amount Dmax1 at the full-aperture in FIG. 15 and accordingly, focus detection should be executed with the aperture adjusted to an f-number slower than the full-aperture.

The maximum image plane defocus amount Dmax at the interchangeable lens 202 is substantially in proportion to the focal length. Accordingly, if the focal length is equal to or greater than a predetermined value, a focus detection may be executed with the aperture adjusted to an f-number slower than the full-aperture. If the focal length is equal to or less than the predetermined value, execution of focus detection with the aperture set at an f-number slower than the full-aperture may be disallowed, or an f-number adjusted in correspondence to the focal length may be set for the aperture when executing focus detection at an f-number slower than the full-aperture.

In addition, when the aperture is set to an f-number slower than the full-aperture, a focus detection light flux may become vignetted in a focus detection area in the periphery of the photographic image plane to result in disabled focus detection. Under such circumstances, execution of focus detection with the aperture adjusted to an f-number slower than the full-aperture may be disallowed in correspondence to the focus detection position, or an f-number adjusted in correspondence to the focus detection position may be set for the aperture if the focus detection is to be executed at an f-number slower than the full-aperture. Alternatively, if the focus detection is to be executed with the aperture adjusted to an f-number slower than the full-aperture, the focus detection may be executed only over a focus detection area near the center of the photographic image plane.

Furthermore, the difference between the distance to the pupil for focus detection and the distance to the exit pupil in the interchangeable lens 202 is also a factor that may cause vignetting of a focus detection light flux. Accordingly, execution of focus detection with the aperture adjusted at an f-number slower than the full-aperture may be disallowed if the distance to the exit pupil in the interchangeable lens 202 is outside a predetermined range, or an f-number slower than the full-aperture, to be set for focus detection, may be adjusted based upon the exit pupil distance information indicating the distance to the exit pupil in the interchangeable lens.

In a low brightness situation, focus detection with the aperture adjusted to an f-number slower than the full-aperture, may be disabled due to a lowered output level with regard to the outputs from the focus detection pixels. Under such circumstances, the execution of focus detection with the aperture adjusted at an f-number slower than the full-aperture may be disallowed if the brightness level is equal to or less than a predetermined brightness level or an f-number slower than the full-aperture, to be set for focus detection, may be adjusted based upon the brightness level.

In summary, if a great extent of defocusing is highly likely to manifest at the time of the current focus detection, the aperture is adjusted to an f-number slower than the full-aperture so as to ensure that the image shift quantity does not exceed the maximum image shift quantity Xmax and, at the same time, the image contrast is raised so as to prevent disabled focus detection.

Another noteworthy advantage is that the image shift quantity is adjusted to a level under the maximum image shift quantity Xmax and also the image contrast is raised in order to prevent disabled focus detection via the aperture, which is used to adjust the light quantity and the extent of blurring during photographing operation, without having to provide any addition dedicated means for preventing disabled focus detection.

The focus detection arithmetic processing (correlation arithmetic processing) executed in step 130 in FIG. 13 is now explained in detail. High-frequency cut filter processing such as that expressed in (2) below is executed on a pair of data strings ($\alpha_1 \sim \alpha_m$ and $\beta_1 \sim \beta_m$ indicates the number of sets of data) output from the focus detection pixel row, so as to generate a first data string and a second data string ($A_1 \sim A_N$ and $B_1 \sim B_N$), from which a noise component or a high-frequency component that would adversely affect the correlation processing has been eliminated. It is to be noted that the high-frequency cut filter processing may be skipped if the arithmetic operation needs to be completed faster or if the extent of defocusing is already significant and thus it is obvious that only a very small high-frequency component is present.

$$A_n = \alpha_n + 2 \times \alpha_{n+1} + \alpha_{n+2}$$

$$B_n = \beta_n + 2 \times \beta_{n+1} + \beta_{n+2} \qquad (2)$$

In expression (2) above, n=1~N.

The correlation quantity C(k) is calculated by executing a correlation operation expressed in (3) on the data strings $A_n$ and $B_n$.

$$C(k) = \Sigma |A_n \times B_{n+1+k} - B_{n+k} \times A_{n+1}| \qquad (3)$$

Figure 19A:
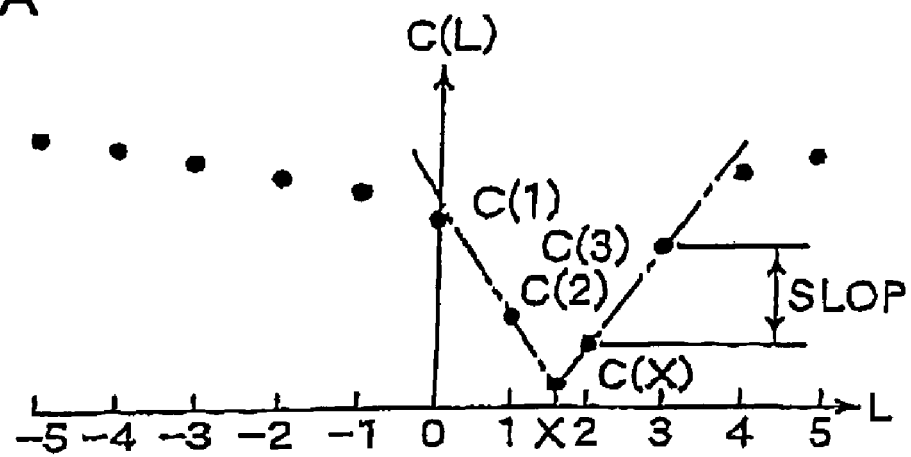
FIGS. 19A through 19C illustrate the correlation arithmetic processing.

In expression (3), the $\Sigma$ operation is cumulatively executed with regard to n and the range assumed for n is limited to the range over which the data $A_n$, $A_{n+1}$, $B_{n+k}$ and $B_{n+1+k}$ exist in correspondence to the shift quantity k. In addition, the shift quantity k is an integer which represents a relative shift quantity assuming a value taken in units matching the data interval with which the data in the data strings are sampled. The results of the arithmetic operation executed as expressed in (3) may indicate that the correlation quantity C(k) assumes the smallest value (the smaller the value, the higher the correlation level) at the shift quantity at which the pair of sets of data achieve a high level of correlation (when k=kj=2 in FIG. 19A).

The shift quantity x, which gives the smallest value C(x) in the continuous correlation quantity graph, is determined by adopting a three-point interpolation method expressed in (4)~(7) below.

$$x = k_j + D/\text{SLOP} \qquad (4)$$

$$C(x) = C(k_j) - |D| \qquad (5)$$

$$D = \{C(k_{j-1}) - C(k_{j+1})\}/2 \qquad (6)$$

$$\text{SLOP} = \text{MAX}\{C(k_{j+1}) - C(k_j), C(k_{j-1}) - C(k_j)\} \qquad (7)$$

Figure 19B:
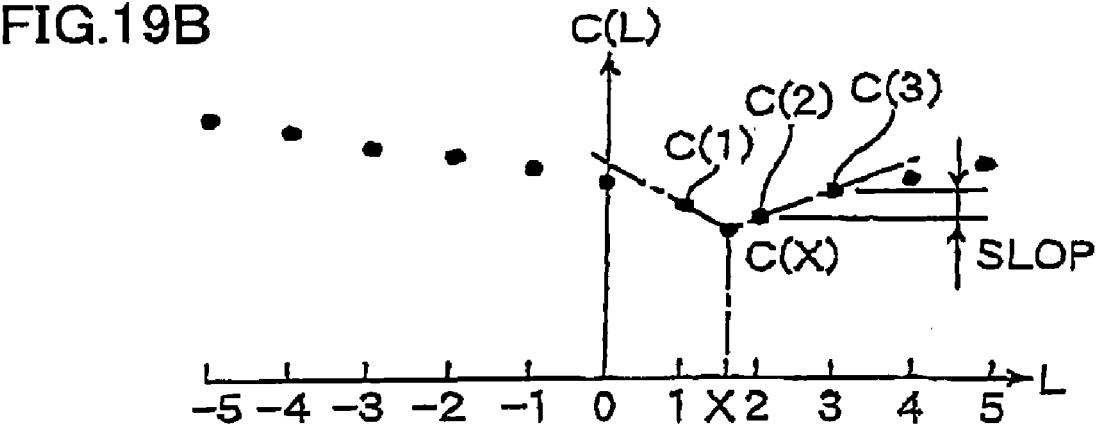
Figure 19C:
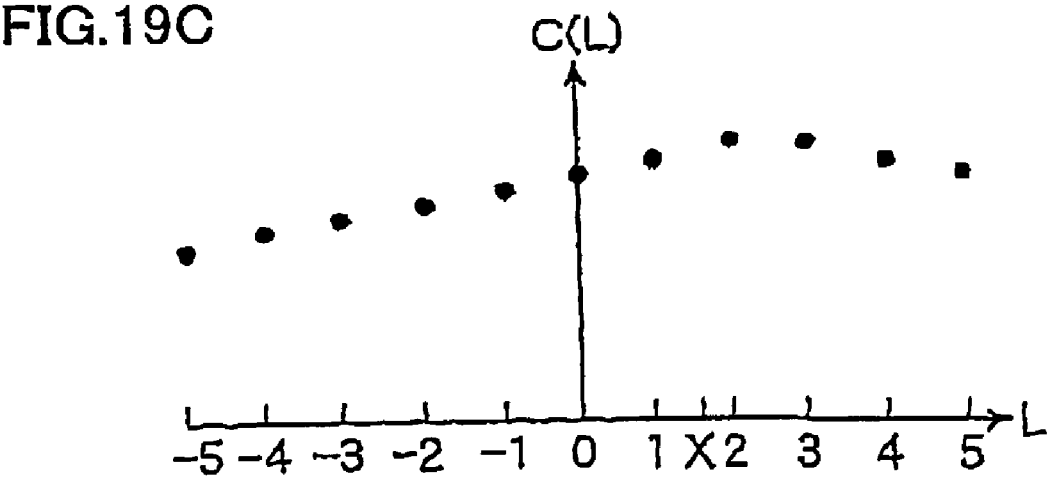

The judgment as to whether or not the shift quantity x calculated as expressed in (4) is reliable is made as follows. As shown in FIG. 19B, the interpolated minimum value C(x) of the correlation quantity increases when the level of correlation between the pair of sets of data is low. Accordingly, if C(x) is equal to or greater than a predetermined threshold value, the shift quantity is judged to be less reliable and the calculated shift quantity x is canceled. Alternatively, C(x) may be standardized with regard to the data contrast, and in such a case, if the value obtained by dividing C(x) by SLOP indicating a value in proportion to the contrast is equal to or greater than a predetermined value, the calculated shift quantity should be judged to be not reliable and accordingly, the calculated shift quantity x is canceled. As a further alternative, if SLOP indicating the value in proportion to the contrast is equal to or less than a predetermined value, the subject should be judged to be a low-contrast subject and, accordingly, the reliability of the calculated shift quantity should be judged to be low and the calculated shift quantity x is canceled. If the level of correlation between the pair of sets of data is low and the correlation quantity C(k) does not dip at all over the shift range kmin to kmax, as shown in FIG. 19C, the minimum value C(x) cannot be determined. In this case, it is decided that focus detection cannot be executed.

It is to be noted that the correlation quantity C(k) may be calculated by using the following correlation operation expression instead of correlation operation expression (3).

$$C(k)=\Sigma|A_n/A_{n+1}-B_{n+k}/B_{n+1+k}| \quad (8)$$

In expression (8), the $\Sigma$ operation is cumulatively executed with regard to n and the range assumed for n is limited to the range over which the data $A_n$, $A_{n+1}$, $B_{n+k}$ and $B_{n+1+k}$ exist in correspondence to the shift quantity k.

The correlation quantity may be calculated by using a correlation operation expression other than expression (3) or expression (8). As long as the level of correlation between a pair of sets of image data with a gain difference relative to each other can be detected.

For instance, a correlation operation may be executed to calculate the level of correlation between the first signal data string and the second signal data string by first generating first arithmetic operation data constituted with the product of multiplying first data in the first data string by data near second data corresponding to the first data, which are part of the second signal data string. Then, second arithmetic operation data may be generated by multiplying the second data in the second signal data string by data near the first data in the first signal data string, and the correlation factor indicating the level of correlation between the first arithmetic operation data and the second arithmetic operation data may be calculated.

As an alternative, a correlation operation may be executed to calculate a correlation factor indicating the level of correlation between the first signal data string and the second signal data string by first obtaining arithmetic operation data by executing a first arithmetic operation on first data and data near the first data in the first signal data string. Then, arithmetic operation data may be obtained through a second arithmetic operation executed on second data corresponding to the first data and data near the second data in the second signal data string. First arithmetic operation data may be obtained as the product of the two sets of arithmetic operation data. Next, arithmetic operation data may be obtained through the first arithmetic operation executed on the second data and the data near the second data in the second signal data string and arithmetic operation data may be obtained through the second arithmetic operation executed on the first data and the data near the first data in the first signal data string. Second arithmetic operation data may be obtained as the product of the two sets of arithmetic operation data. Subsequently, the correlation factor indicating the level of correlation between the first arithmetic operation data and the second arithmetic operation data may be calculated.

As a further alternative, the following correlation operation may be executed to determine a correlation factor indicating the level of correlation between the first signal data string and the second signal data string. First, first arithmetic operation data and second arithmetic operation data may be generated by executing a first arithmetic operation and a second arithmetic operation on at least either first data or data near the first data in the first signal data string and then third arithmetic operation data may be generated by dividing the first arithmetic operation data by the second arithmetic operation data. Next, fourth arithmetic operation data and fifth arithmetic operation data may be generated by executing the first arithmetic operation and the second arithmetic operation on at least either second data corresponding to the first data or data near the second data in the second signal data string and then sixth arithmetic operation data may be generated by dividing the fourth arithmetic operation data by the fifth arithmetic operation data. Then, the correlation factor indicating the level of correlation between the third arithmetic operation data and the sixth arithmetic operation data may be calculated.

As yet another alternative, the following correlation operation may be executed to determine a correlation factor indicating the level of correlation between the first signal data string and the second signal data string. First, first arithmetic operation data may be generated by executing a first arithmetic operation on at least either first data or data near the first data in the first signal data string. Then, second arithmetic operation data may be generated by executing the first arithmetic operation on at least either second data corresponding to the first data or data near the second data in the second signal data string, and third arithmetic operation data may be generated by dividing the first arithmetic operation data by the second arithmetic operation data. Subsequently, fourth arithmetic operation data may be generated by executing a second arithmetic operation on at least either first data or data near the first data in the first signal data string. Then, fifth arithmetic operation data may be generated by executing the second arithmetic operation on at least either second data or data near the second data in the second signal data string, and sixth arithmetic operation data may be generated by dividing the fourth arithmetic operation data by the fifth arithmetic operation data. Subsequently, the correlation factor indicating the level of correlation between the third arithmetic operation data and the sixth arithmetic operation data may be calculated.

VARIATIONS OF THE EMBODIMENT OF THE INVENTION

Figure 20:
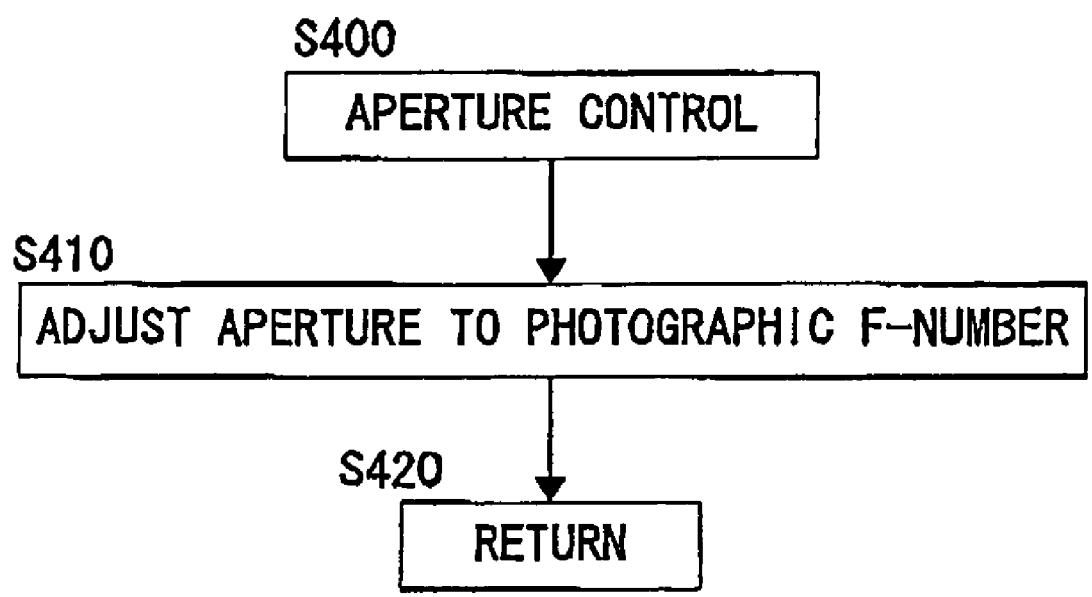
FIG. 20 presents a flowchart of a variation of the aperture control.

FIG. 20 presents a flowchart of a variation of the aperture control executed in step 110 in FIG. 13. In the aperture control shown in FIG. 14, the aperture is controlled so as to adjust it to an f-number slower than the full-aperture for focus detection in order to prevent the focus detection from becoming disabled due to a significant extent of defocusing. As an alternative, the aperture may be adjusted to the aperture value for a photographing operation in step 410, as shown in FIG. 20. For instance, aperture control information indicating a photographic aperture value automatically determined in correspondence to the photographic field brightness measured by the photometering means (not shown in FIG. 1) or a photographic aperture value manually set by the user via an operation member (not shown in FIG. 1) may be provided to the lens drive control device 206 so as to set the aperture diameter in correspondence to the photographic aperture value. Through these measures, it is ensured that the image plane detected through the focus detection (the image plane at the photographic f-number) aligns with the image plane during the photographing operation. As a result, the error correction related to the f-number, which would otherwise need to be executed to correct spherical aberration and the like, no longer needs to be executed.

It is to be noted that a plurality of focus detection positions are set in the photographic image plane at the interchangeable lens 202. Accordingly, if focus detection is to be executed at an opening diameter equivalent to an f-number slower than a full-aperture in the interchangeable lens 202, the focus detection should be executed at the focus detection position at the center of the photographic image plane.

Figure 21:
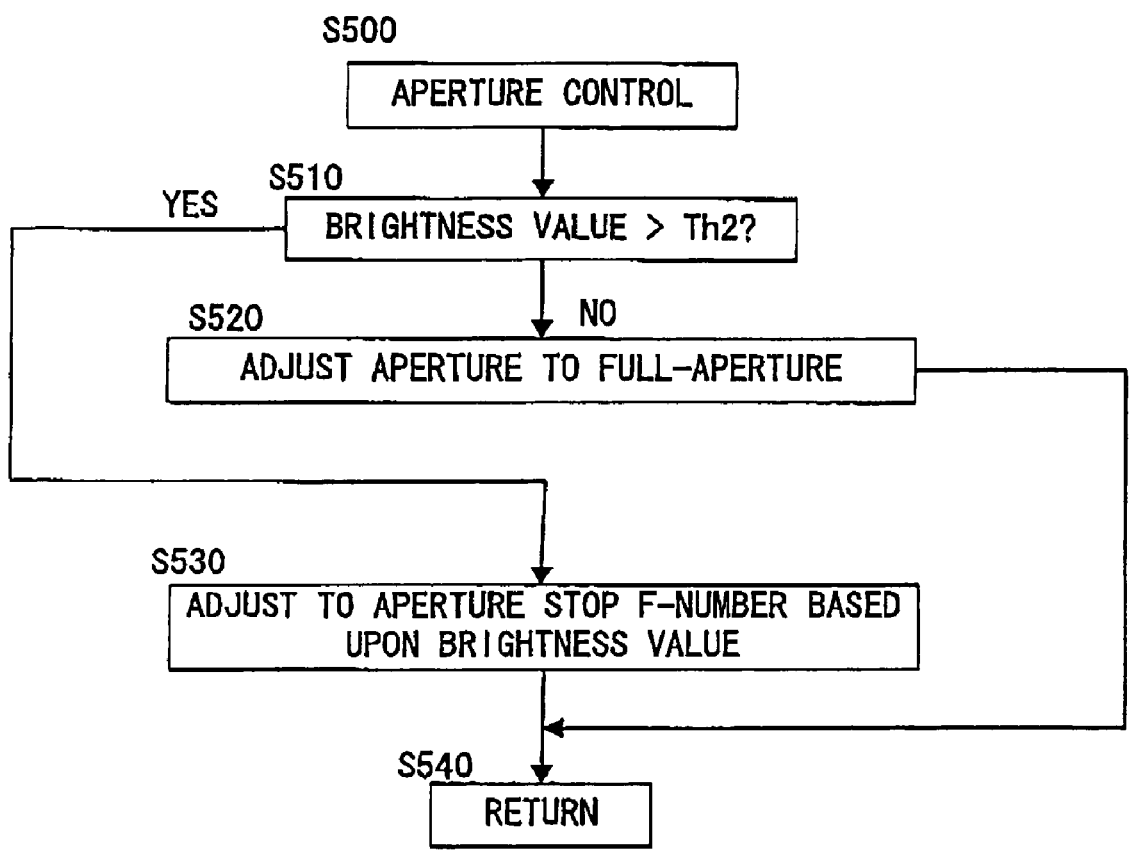
FIG. 21 presents a flowchart of another variation of the aperture control.

FIG. 21 presents a flowchart of another variation of the aperture control executed in step 110 in FIG. 13. In the aperture control shown in FIG. 14, the aperture is controlled so as to adjust it to an f-number slower than a full-aperture for focus detection in order to prevent the focus detection from becoming disabled due to a significant extent of defocusing. As an alternative, the aperture opening may be controlled as shown in FIG. 21. In this variation, a decision is first made in step 510 as to whether or not the brightness value (the photographic field brightness measured by the photometering means (not shown)) is equal to or greater than a predetermined value Th2. If the brightness value is judged to be equal to or greater than the predetermined value Th2, the operation proceeds to step 530 to adjust the aperture to an f-number corresponding to the brightness value. If, on the other hand, the brightness value is judged to be less than the predetermined value Th2, the operation proceeds to step 520 to adjust the aperture to the full-aperture.

For instance, if the image sensor stores the electrical charge over the shortest length of time with the brightness value at Ez (EV value) and the f-number at Fz with Ea representing the metered brightness level and F0 representing the full-aperture of the interchangeable lens, the interchangeable lens may be controlled so as to adjust the aperture to the f-number slower than full-aperture F0 by the number of steps Fa indicated in the following expression.

$$Fa=(Ea-Ez)+(F0-Fz) \quad (9)$$

Through these measures, it is ensured that focus detection is not disabled due to saturation of image data at the image sensor even when the brightness level is high.

While an explanation is given above in reference to the embodiment on an example in which the f-number for the focus detection is switched in correspondence to the state of defocusing and the like, focus detection may be executed at an opening f-number slower than a full-aperture so as to ensure that a significantly large defocus amount can still be detected even when a great change in the defocus amount is expected to occur between focus detection cycles. For instance, an arithmetic operation means for making a decision as to whether or not the subject is a moving subject based upon changes indicated in past defocus amount data may be provided and if the subject is judged to be a moving subject, focus detection may be executed at an opening f-number slower than a full-aperture. Alternatively, the f-number slower than the full-aperture, to be set for the focus detection, may be adjusted in correspondence to the subject displacement speed or the image plane displacement speed at the interchangeable lens.

In addition, if the imaging apparatus is set in a photographing mode (defining the relationship between the shutter speed and the aperture setting) which is suited to photograph a moving subject (e.g., a sports mode), focus detection should be executed at an opening f-number slower than the full-aperture. Focus detection should also be executed at an opening f-number slower than the full-aperture if the imaging apparatus is set in a movie shooting mode or a continuous shooting mode.

Figure 22:
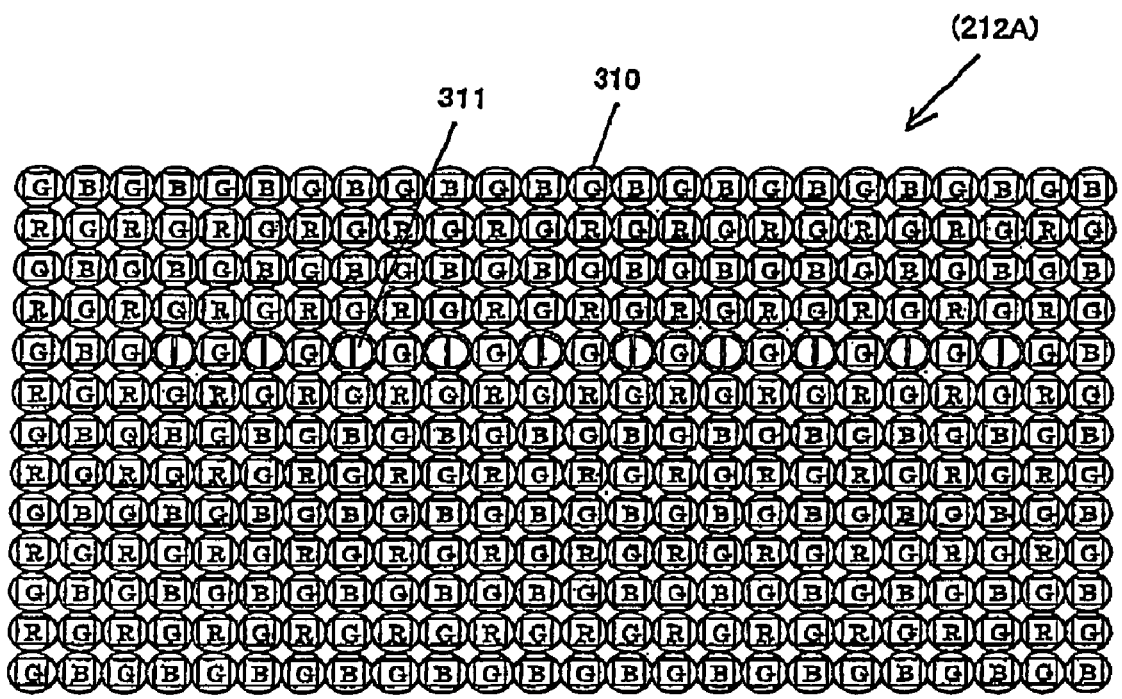
FIG. 22 shows an image sensor achieved in a variation.

While the image sensor 212 in the embodiment shown in FIG. 3 includes the focus detection pixels 311 disposed without allowing any interval between them, the focus detection pixels 311 may be disposed in a single row at alternate pixel positions that would otherwise be taken up by blue pixels as in an image sensor 212A shown in FIG. 22. While the focus detection accuracy is somewhat lowered when the arraying pitch with which the focus detection pixels are disposed is increased, the quality of the image resulting from the correction is improved since the focus detection pixels are set at lower density.

Figure 23:
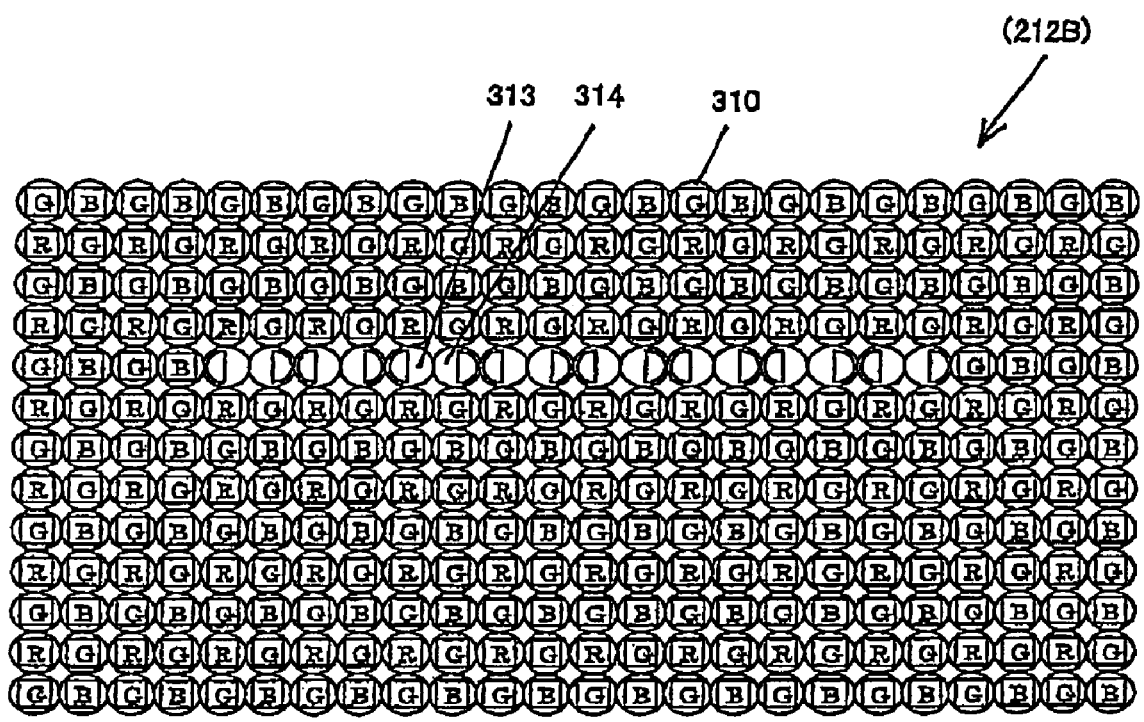
FIG. 23 shows an image sensor achieved in another variation.

While each focus detection pixel 311 in the image sensor 212 achieved in the embodiment in FIG. 3 includes a pair of photoelectric conversion units, a single photoelectric conversion unit may be disposed in each of focus detection pixels 313 and 314, as in an image sensor 212B shown in FIG. 23. In the image sensor in FIG. 23, a focus detection pixel 313 and the focus detection pixel 314 disposed next to the focus detection pixel 313 make up a pair and the pair of focus detection pixels is equivalent to a single focus detection pixel 311 in FIG. 3.

Figure 24A:
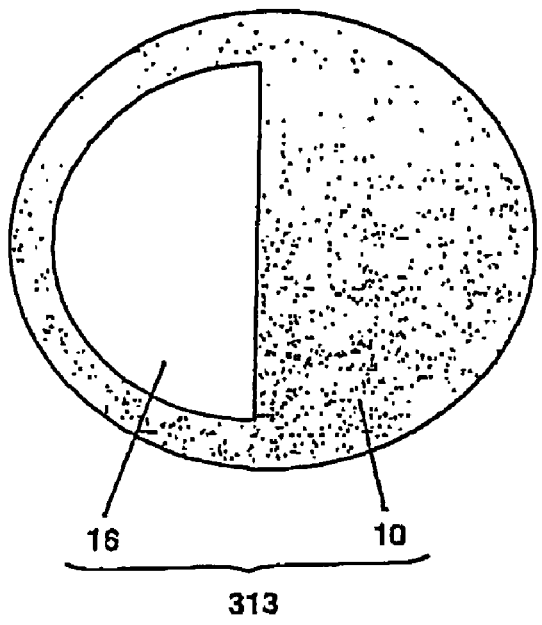
FIGS. 24A and 24B each show the structure that may be adopted in a focus detection pixel at the image sensor shown in FIG. 23.
Figure 24B:
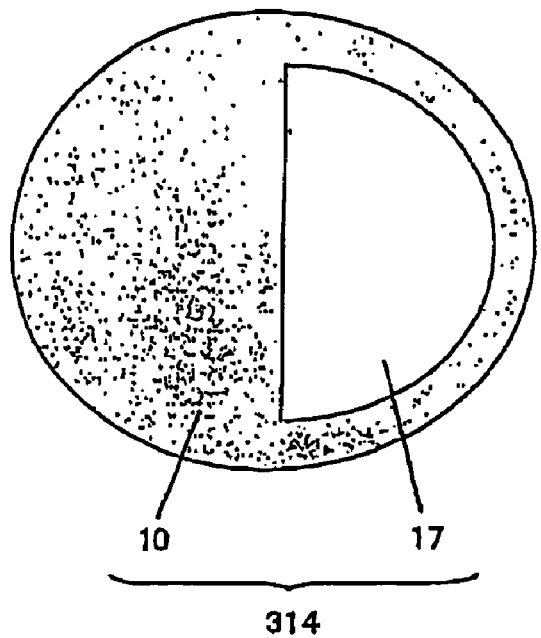

As shown in FIG. 24A, each focus detection pixel 313 is constituted with a micro-lens 10 and a photoelectric conversion unit 16. As shown in FIG. 24B, the focus detection pixels 314 are each constituted with a micro-lens 10 and a photoelectric conversion unit 17. The photoelectric conversion units 16 and 17 are projected onto the exit pupil of the interchangeable lens 202 via the micro-lenses 10 to define the pupils for focus detection 92 and 93 in FIG. 10. As a result, the pairs of image outputs to be used for focus detection can be obtained from the focus detection pixels 313 and 314. With a single photoelectric conversion unit disposed in each focus detection pixel, it is ensured that the structure of the image sensor read circuit does not become complicated.

While the imaging pixels in the image sensor 212 shown in FIG. 3 is equipped with color filters assuming a Bayer array, color filters adopting a structure and an array other than those shown in the figures may be used in conjunction with the present invention. For instance, an image sensor that includes complementary color filters, i.e., G (green) filters, Ye (yellow) filters, Mg (magenta) filters and Cy (cyan) filters, may be used. At this image sensor, the focus detection pixels should be disposed at pixel positions that would otherwise be occupied by imaging pixels equipped with cyan filters and magenta filters (i.e., imaging pixels equipped with color filters that contain a blue component with which the output error is relatively unnoticeable).

While the focus detection pixels in the image sensor 212 shown in FIG. 3 are not equipped with color filters, the present invention may be adopted in conjunction with focus detection pixels equipped with color filters, the color of which matches one of the colors of the color filters at the imaging pixels (e.g., green filters).

While the image sensor 212 in FIG. 3 includes focus detection pixels replacing some of the imaging pixels, the image sensor may instead adopt a structure in which all the pixels therein are focus detection pixels.

While the image sensor 212 in FIG. 3 assumes a dense square grid array constituted with imaging pixels and focus detection pixels, it may instead adopt a dense hexagonal grid array.

The image sensors 212, 212A and 212B described above may each be constituted with a CCD image sensor or a CMOS image sensor.

It is to be noted that the present invention may be adopted in imaging apparatuses other than that shown in FIG. 1 equipped with the image sensor 212 which includes focus detection pixels so as to function as a focus detection image sensor as well as an image-capturing image sensor. The present invention may be adopted in an imaging apparatus in which a photographing light flux is split via a light splitting means such as a half mirror and the split light fluxes are detected at an image sensor and a dedicated focus detection sensor disposed in the respective light paths.

Figure 25:
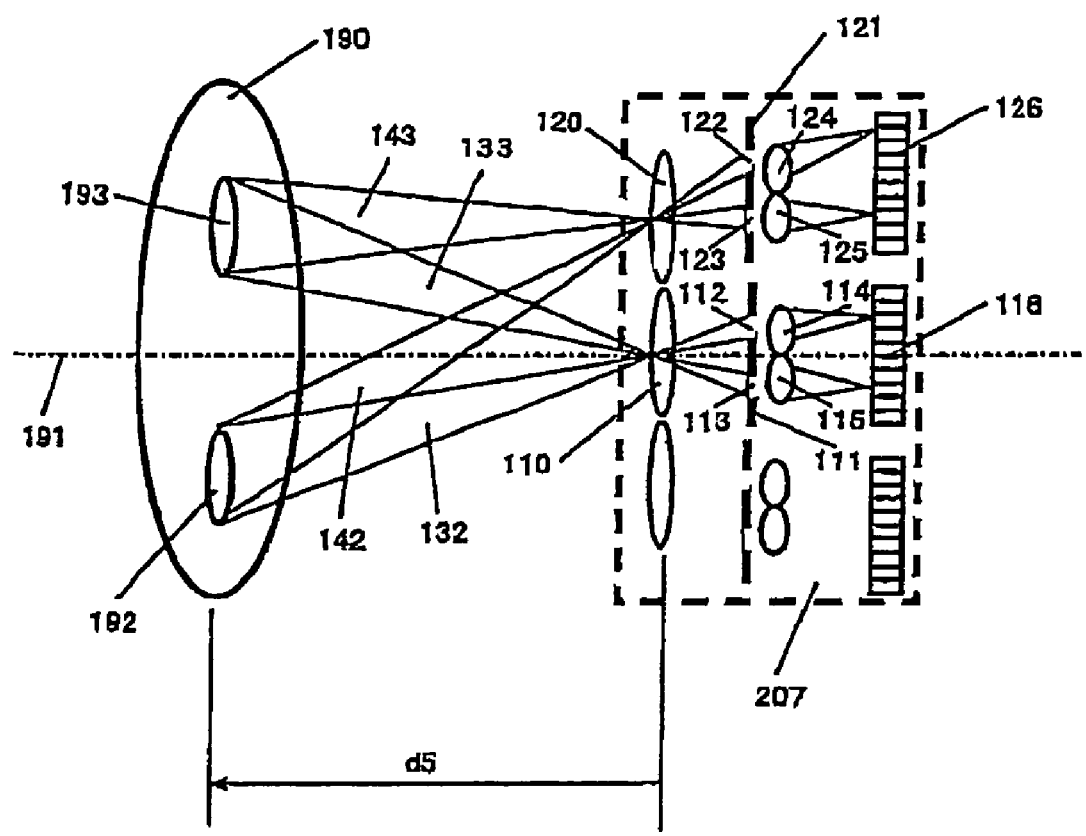
FIG. 25 illustrates focus detection adopting an image reforming split pupil method.

In addition, the present invention is not limited to a focus detection device that executes focus detection via micro-lenses by adopting a split pupil method, and it may be adopted instead in a focus detection device adopting an image reforming split pupil method. In reference to FIG. 25, focus detection executed by adopting the image reforming split pupil method is described. In FIG. 25, reference numerals 191 indicates the optical axis of the interchangeable lens, reference numerals 110 and 120 each indicate a condenser lens, reference numerals 111 and 121 each indicate an aperture mask, reference numerals 112, 113, 122 and 123 each indicate an aperture opening, reference numerals 114, 115, 124 and 125 each indicate an image reforming lens and reference numerals 116 and 126 each indicate a focus detection image sensor (CCD). In addition, reference numerals 132, 133, 142 and 143 each indicate a focus detection light flux and reference numeral 190 indicates an exit pupil set over a distance d5 further to the front relative to the predetermined imaging plane of the interchangeable lens 202. The distance d5, which is determined in correspondence to the focal lengths of the condenser lenses 110 and 120, the distances to the aperture openings 112, 113, 122 and 123 from the condenser lenses 110 and 120 and the like, is referred to as a distance to a pupil for focus detection in the description.

Reference numeral 192 indicates an area (pupil for focus detection) defined by the aperture openings 112 and 122 projected via the condenser lenses 110 and 120, whereas reference numeral 193 indicates an area (pupil for focus detection) defined by the aperture openings 113 and 123 projected via the condenser lenses 110 and 120. The condenser lens 110, the aperture mask 111, the aperture openings 112 and 113, the image reforming lenses 114 and 115 and the image sensor 116 constituted a focus detection unit 207 that executes focus detection through split pupil phase difference detection at a given position by adopting the image reforming method.

FIG. 25 schematically illustrates a focus detection unit present on the optical axis 191 and a focus detection unit present off the optical axis. By using a plurality of focus detection units in combination, a dedicated focus detection sensor capable of executing focus detection through split pupil phase difference detection adopting the image reforming method at five different focus detection positions, as indicated by 101 through 105 in FIG. 2, can be realized.

The focus detection unit that includes the condenser lens 110 comprises the condenser lens 110 disposed near the predetermined imaging plane of the imaging optical system (equivalent to the interchangeable lens 202 in FIG. 1), the image sensor 116 disposed to the rear of the condenser lens, the pair of image reforming lenses 114 and 115 disposed between the condenser lens 110 and the image sensor 116 to reform a primary image having been formed near the predetermined imaging plane onto the image sensor 116 and the aperture mask 111 that includes the pair of aperture openings 112 and 113 disposed near the pair of image reforming lenses (to the front of the lenses in the figure). The image sensor 116 is a line sensor constituted with a plurality of photoelectric conversion units densely disposed along a straight line. The photoelectric conversion units in the image sensor are disposed along a direction matching the direction along which the pair of pupils for focus detection are separated from each other (the direction along which the aperture openings are set side-by-side).

Information corresponding to the intensity distributions in the pair of images reformed on the image sensor 116 is output from the image sensor 116. Through the image shift detection arithmetic processing (correlation processing, phase difference detection processing) executed on the information as described earlier, the image shift quantity indicating the extent of shift of the pair of images is detected through the split pupil phase difference detection method (image reforming method). The image shift quantity then undergoes the conversion processing explained earlier so as to calculate the extent of deviation (the defocus amount) of the current image forming plane relative to the predetermined imaging plane. The image sensor 116 is projected onto the predetermined imaging plane via the image reforming lenses 114 and 115, and the accuracy with which the defocus amount (image shift quantity) is detected is determined in correspondence to the image shift quantity detection pitch (the pitch at which the photoelectric conversion units, projected onto the predetermined imaging plane, are disposed in the case of detection executed by adopting the image reforming method).

The aperture openings 112 and 113 at the aperture mask 111 are projected via the condenser lens 110 onto the exit pupil 190, defining the areas 192 and 193. The areas 192 and 193 are referred to as pupils for focus detection. Namely, the pair of images reformed on the image sensor 116 are formed with light fluxes passing through the pair of pupils for focus detection 192 and 193 on the exit pupil 190. The light fluxes 132 and 133 passing through the pair of pupils 192 and 193 for focus detection on the exit pupil 190 are referred to as focus detection light fluxes.

It is to be noted that applications of the present invention are not limited to those in a focus detection device that executes focus detection via micro-lenses by adopting the split pupil phase difference detection method or a focus detection device adopting the image reforming phase difference detection method. In other words, it may be adopted in any focus detection device that detects the state of focus adjustment of the imaging optical system by calculating the extent of image shift manifested by a pair of images formed with a pair of light fluxes passing through pupils defined by splitting the exit pupil of the imaging optical system. For instance, the present invention may be adopted in a split pupil-type focus detection device that executes focus detection by using polarized light or a focus detection device that utilizes the pupil through time division by either mechanically or electronically switching the pupil.

In addition, the present invention may be adopted in a focus detection device that executes a hybrid focus detection by adopting both the phase difference focus detection described above and, for instance, a contrast focus detection.

The imaging apparatus according to the present invention may be embodied as an apparatus other than a digital still camera or a film still camera with an interchangeable lens mounted at the camera body. The present invention may also be adopted in a digital still camera or a film still camera with an integrated lens. It may also be adopted in a compact camera module built into a portable telephone or the like, a surveillance camera or the like as well. The present invention may be further adopted in a focus detection device installed in a device other than a camera, a range-finding device or a stereo range-finding device.

The above described embodiments are examples and various modifications can be made without departing from the scope of the invention.

What is claimed is:

1. A focus detection device, comprising:
   focus detection elements that include a plurality of micro-lenses and light-receiving elements that generate a pair of signals corresponding to a pair of light fluxes each passing through an imaging optical system that includes a lens and an aperture stop, each of the light-receiving elements being disposed in correspondence to one of the micro-lenses and receiving the light fluxes from the imaging optical system via the micro-lenses;
   a focus detector that determines a first focus adjustment state of the imaging optical system with a full-aperture of the imaging optical system, based upon the pair of signals; and
   a condition judging unit that judges whether or not the first focus adjustment state satisfies a specific condition, wherein:
   if the condition judging unit judges that the first focus adjustment state satisfies the specific condition, the focus detector determines a second focus adjustment state with an f-number slower than the full-aperture of the imaging optical system.

2. A focus detection device according to claim 1, wherein:
   the condition judging unit makes a judgment that the first focus adjustment state satisfies the specific condition if the first focus adjustment state is in a defocusing state.

3. A focus detection device according to claim 1, wherein:
   the condition judging unit makes a judgment that the first focus adjustment state does not satisfy the specific condition if the first focus adjustment state determined in a previous detection results is in a focusing state; and
   the focus detector determines the first focus adjustment state with the full-aperture.

4. A focus detection device according to claim 1, wherein:
   the focus detector determines the f-number slower than the full-aperture based upon characteristics of the imaging optical system.

5. A focus detection device according to claim 4, wherein:
   the characteristics of the imaging optical system is at least one of the full-aperture in the imaging optical system, an exit pupil distance, a focal length, a position of a focusing lens and a maximum image plane defocus amount indicating a maximum defocus amount that may be measured within a focus adjustment range of the imaging optical system.

6. A focus detection device according to claim 4, wherein:
   the focus detector is disallowed to determine the second focus adjustment state with the f-number slower than the full-aperture if the characteristics of the imaging optical system satisfy a predetermined condition.

7. A focus detection device according to claim 6, wherein:
   the predetermined condition is any one of conditions that the full-aperture of the imaging optical system is slower than a predetermined aperture, a focal length of the imaging optical system is smaller than a predetermined value, an exit pupil distance indicating a distance to an exit pupil of the imaging optical system is beyond a predetermined range, and a previous defocus amount having been detected previously is equal to or greater than a maximum image plane defocus amount indicating a maximum defocus amount that may be measured within a focus adjustment range of the imaging optical system.

8. A focus detection device according to claim 1, wherein:
   the condition judging unit makes a judgment that the first focus adjustment state satisfies the specific condition if the focus detector is unable to determine the first focus adjustment state.

9. A focus detection device according to claim 1, further comprising:
   a contrast detection unit that detects contrast in a pair of images based upon the pair of signals generated at the focus detection elements, wherein:
   the condition judging unit makes a judgment that the first focus adjustment state satisfies the specific condition if the contrast detected by the contrast detection unit is less than a predetermined value.

10. A focus detection device according to claim 9, wherein:
    the condition judging unit makes a judgment that the first focus adjustment state does not satisfy the specific condition if the contrast detected by the contrast detection unit is equal to or greater than the predetermined value, and
    the focus detector determines the first focus adjustment state with the full-aperture.

11. A focus detection device according to claim 1, further comprising:
    a brightness detection unit that detects brightness of a target object, wherein:
    the condition judging unit makes a judgment that the first focus adjustment state satisfies the specific condition if the brightness detected by the brightness detection unit is equal to or greater than a predetermined value.

12. A focus detection device according to claim 11, wherein:
    the focus detector determines the first focus adjustment state with the full-aperture if the brightness detected by the brightness detection unit is less than the predetermined value.

13. A focus detection device according to claim 1, wherein:
    the focus detector calculates the defocus amount with an f-number selected under control executed during a photographing operation.

14. A focus detection device according to claim 1, wherein:
    a plurality of focus detection points are set within a photographic image plane of the imaging optical system; and
    when calculating an amount of image shift of the imaging optical system with the f-number slower than the full-aperture, the focus detector uses the pair of signals provided from the focus detection elements at the focus detection point set at the center of the photographic image plane.

15. A focus detection device according to claim 1, wherein:
    the focus detector determines the second focus adjustment state with the f-number slower than the full-aperture before image taking starts.

16. An imaging apparatus, comprising:
    focus detection elements that include a plurality of micro-lenses and light-receiving elements that generate a pair of signals corresponding to a pair of light fluxes each passing through an imaging optical system that includes a lens and an aperture stop, each of the light-receiving elements being disposed in correspondence to one of the micro-lenses and receiving the light fluxes from the imaging optical system via the micro-lenses;
    an aperture drive unit that drives the aperture stop;

a focus detector that determines a first focus adjustment state of the imaging optical system with a full-aperture of the imaging optical system, based upon the pair of signals;
a condition judging unit that judges whether or not the first focus adjustment state satisfies a specific condition; and
a control unit that makes the aperture drive unit drive the aperture stop with an f-number slower than the full-aperture of the imaging optical system and makes the focus detector determine a second focus adjustment state, if the first focus adjustment state satisfies the specific condition.

17. An imaging apparatus according to claim 16, wherein: the focus detector determines the second focus adjustment state with an f-number selected in control executed during a photographing operation.

18. An imaging apparatus according to claim 16, further comprising:
a brightness detection unit that detects brightness of a target object based upon the pair of signals generated from the focus detection elements, wherein:
the condition judging unit makes a judgment that the first focus adjustment state satisfies the specific condition if the brightness detected by the brightness detection unit is equal to or greater than a predetermined value; and
the focus detector determines the second focus adjustment state with the f-number slower than the full-aperture.

19. An imaging apparatus according to claim 16, wherein: when one of a movie shooting mode, a continuous shooting mode and a moving subject shooting mode is selected, the focus detector determines the second focus adjustment state with the f-number slower than the full-aperture.

20. An imaging apparatus, comprising:
a photoelectric conversion element that is equipped with imaging elements and focus detection elements both of which are disposed on a single plane, the imaging elements forming an optical image based upon light fluxes passing through an imaging optical system including a lens and an aperture stop and generating signals used to form a photographic image, and the focus detection elements generating a pair of signals corresponding to a pair of light fluxes each passing through the imaging optical system;
an aperture drive unit that drives the aperture stop;
a focus detector that determines a first focus adjustment state of the imaging optical system with a full-aperture of the imaging optical system, based upon the pair of signals;
a condition judging unit that judges whether or not the first focus adjustment state satisfies a specific condition; and
a control unit that makes the aperture drive unit drive the aperture stop with an f-number slower than a full-aperture of the imaging optical system and makes the focus detector determine a second focus adjustment state, if the first focus adjustment state satisfies the specific condition.

21. A focus detection method, comprising:
generating, via focus detection elements including light-receiving elements, a pair of signals corresponding to a pair of light fluxes each passing through an imaging optical system that includes a lens and an aperture stop;
determining a first focus adjustment state of the imaging optical system with a full-aperture of the imaging optical system, based upon the pair of signals;
judging whether or not the first focus adjustment state satisfies a specific condition; and
determining a second focus adjustment state with an f-number slower than the full-aperture of the imaging optical system, if the first focus adjustment state is judged to satisfy the specific condition.

22. A focus detection device, comprising:
focus detection elements including light-receiving elements that generate a pair of signals corresponding to a pair of light fluxes each passing through an imaging optical system that includes a lens and an aperture stop; and
a focus detector including a processor that determines a focus adjustment state of the imaging optical system with an f-number slower than a full-aperture of the imaging optical system when a specific condition is fulfilled, wherein:
the focus detector determines the f-number slower than the full-aperture based upon characteristics of the imaging optical system, and disallows focus detection of the imaging optical system with the f-number slower than the full-aperture if the characteristics of the imaging optical system satisfy a predetermined condition, and
the predetermined condition is any one of conditions that the full-aperture of the imaging optical system is slower than a predetermined aperture, a focal length of the imaging optical system is smaller than a predetermined value, an exit pupil distance indicating a distance to an exit pupil of the imaging optical system is beyond a predetermined range, and a previous defocus amount having been detected previously is equal to or greater than a maximum image plane defocus amount indicating a maximum defocus amount that may be measured within a focus adjustment range of the imaging optical system.

23. A focus detection device, comprising:
focus detection elements including light-receiving elements that generate a pair of signals corresponding to a pair of light fluxes each passing through an imaging optical system that includes a lens and an aperture stop;
a focus detector including a processor that determines a focus adjustment state of the imaging optical system with an f-number slower than a full-aperture of the imaging optical system when a specific condition is fulfilled;
a condition judging unit that judges as to whether or not the pair of signals generated at the focus detection element are in the specific condition; and
a contrast detection unit that detects contrast in a pair of images based upon the pair of signals generated at the focus detection elements, wherein:
the condition judging unit makes a judgment that the pair of signals are in the specific condition if the contrast detected by the contrast detection unit is less than a predetermined value, and
when the condition judging unit makes a judgment that the specific condition is not satisfied based upon the contrast detected by the contrast detection unit being equal to or greater than the predetermined value, the focus detector determines the focus adjustment state of the imaging optical system based upon the pair of signals generated from the light fluxes passing through the imaging optical system with the full-aperture.

24. A focus detection device, comprising:
focus detection elements that include a plurality of microlenses and light-receiving elements that generate a pair of signals corresponding to a pair of light fluxes each passing through an imaging optical system that includes a lens and an aperture stop, each of the light-receiving elements being disposed in correspondence to one of the micro-lenses and receiving the light fluxes from the imaging optical system via the micro-lenses;

a focus detector that determines a first focus adjustment state of the imaging optical system with a full-aperture of the imaging optical system, based upon the pair of signals; and a condition judging unit that judges whether or not the first focus adjustment state satisfies a specific condition, a brightness detection unit that detects brightness of a target object, wherein:

the condition judging unit makes a judgment that the first focus adjustment state satisfies the specific condition if the brightness detected by the brightness detection unit is equal to or greater than a predetermined value, and if the condition judging unit judges that the first focus adjustment state satisfies the specific condition, the focus detector determines a second focus adjustment state with an f-number slower than the full-aperture of the imaging optical system.

25. A focus detection device, comprising:

focus detection elements that include a plurality of micro-lenses and light-receiving elements that generate a pair of signals corresponding to a pair of light fluxes each passing through an imaging optical system that includes a lens and an aperture stop, each of the light-receiving elements being disposed in correspondence to one of the micro-lenses and receiving the light fluxes from the imaging optical system via the micro-lenses;

a focus detector that determines a focus adjustment state of the imaging optical system at a predetermined focus detection cycle, based upon the pair of signals; and a condition judging unit that judges whether or not the focus detector is able to determine the focus adjustment state at a previous focus detection cycle, wherein:

if the condition judging unit judges that the focus detector is unable to determine the focus adjustment state at the previous focus detection cycle, the focus detector determines a focus adjustment state with an f-number slower than a full-aperture of the imaging optical system at a current focus detection cycle.

* * * * *